United States Patent
Yeo et al.

(10) Patent No.: US 6,679,144 B2
(45) Date of Patent: Jan. 20, 2004

(54) BRAKE LATHE SUSPENSION ARM

(75) Inventors: Harold O. Yeo, Mississauga (CA); Christopher L. Greenwald, Concord, NH (US); Jeffrey P. Hastings, Hanover city, NH (US); David E. Cox, Jr., Pewaukee, WI (US)

(73) Assignee: Wheeltronic Ltd., Mississauga (CA)

( * ) Notice: Subject to any disclaimer, the term of this patent is extended or adjusted under 35 U.S.C. 154(b) by 93 days.

(21) Appl. No.: 09/975,017

(22) Filed: Oct. 12, 2001

(65) Prior Publication Data

US 2002/0043137 A1 Apr. 18, 2002

Related U.S. Application Data

(60) Provisional application No. 60/239,909, filed on Oct. 13, 2000.

(51) Int. Cl.[7] .............................. B23B 5/04; B23B 5/32; E02C 3/00
(52) U.S. Cl. ...................... 82/112; 82/117; 254/89 R
(58) Field of Search ..................... 82/112, 120, 158, 82/131, 173; 269/71; 254/89 R; 901/14, 41; 408/236; 409/89

(56) References Cited

U.S. PATENT DOCUMENTS

| | | | | |
|---|---|---|---|---|
| 1,754,978 A | * | 4/1930 | Buss | 81/57.4 |
| 2,002,727 A | * | 5/1935 | Andren | 408/8 |
| 2,345,318 A | * | 3/1944 | Bakewell | 408/236 |
| 2,629,268 A | * | 2/1953 | Budney | 408/236 |
| 2,652,862 A | * | 9/1953 | Henry | 83/486.1 |
| 3,913,582 A | * | 10/1975 | Sharon | 606/19 |
| 4,118,141 A | * | 10/1978 | Spohn, Jr. | 408/90 |
| 4,239,551 A | * | 12/1980 | Smith | 134/6 |
| 4,367,532 A | * | 1/1983 | Crum et al. | 700/260 |
| 4,493,231 A | * | 1/1985 | Wossner | 82/112 |
| 4,732,186 A | * | 3/1988 | Nishikawa | 134/123 |
| 4,989,823 A | * | 2/1991 | Chapman | 248/638 |
| 5,098,254 A | * | 3/1992 | Becicka et al. | 414/792.9 |
| 5,142,930 A | * | 9/1992 | Allen et al. | 74/469 |
| 5,279,192 A | * | 1/1994 | Hartman | 82/112 |
| 5,549,023 A | * | 8/1996 | Strout et al. | 82/112 |
| 5,634,503 A | * | 6/1997 | Musil et al. | 141/232 |
| 5,748,767 A | * | 5/1998 | Raab | 382/128 |
| 5,971,677 A | * | 10/1999 | Lan | 408/236 |
| 5,974,878 A | | 11/1999 | Newell et al. | |
| 6,101,911 A | | 8/2000 | Newell et al. | |
| 6,182,796 B1 | | 2/2001 | Perlstein et al. | |
| 6,186,279 B1 | | 2/2001 | Blocker et al. | |
| 6,189,272 B1 | | 2/2001 | Deiss et al. | |
| 6,280,305 B1 | * | 8/2001 | Donatelli et al. | 451/270 |
| 6,394,740 B1 | * | 5/2002 | Derby et al. | 414/744.1 |
| 2002/0066341 A1 | * | 6/2002 | Greenwald et al. | 82/112 |

OTHER PUBLICATIONS

Article copyrighted by Hein–Werner Collision Repair Equipment Group showing work bench stations shown with MultiBenchLift from Blackhawk.

* cited by examiner

*Primary Examiner*—A. L. Wellington
*Assistant Examiner*—Brian D. Walsh
(74) *Attorney, Agent, or Firm*—Eugene J. A. Gierczak

(57) ABSTRACT

An articulated arm assembly adapted to carry machine means comprising a first member, a second member pivotally connected at one end thereof to said first member for pivotal movement thereabout, a third member extending outwardly from another end of said second member, said third member including means for connection to said machine means, means for adjusting the position of said machine means.

17 Claims, 25 Drawing Sheets

DETAIL F

DETAIL E

DETAIL D

DETAIL C

DETAIL G

DETAIL B

DETAIL A

SECTION A-A

DETAIL A

BRAKE LATHE SUSPENSION ARM

This application claims the benefit of provisional application 60/239,909 filed Oct. 13, 2000.

FIELD OF THE INVENTION

This invention relates to an articulated arm assembly for carrying machine means and particularly relates to a brake lathe suspension arm. A device for docking an articulated arm assembly for a vehicle lift is also disclosed.

BACKGROUND OF THE INVENTION

Various two post and four post lifts have heretofore been utilized to lift vehicles such as automobiles or the like from ground level to a lifted position. Such two post and four post lifts are commonly used to service vehicles whether for oil changes, installation of new tires or replacement of brakes.

Various on vehicle brake lathes have heretofore been designed in order to resurface opposite sides of a brake disc for a wheel or to resurface the inside of a wheel drum for brake mechanisms.

For example U.S. Pat. No. 5,653,153 relates to an alignment device to be mounted on a vehicle brake lathe to provide quick and easy lateral runout compensation. Such adapter is carried on a wheeled carriage, which is adapted to be rolled on a surface such as a floor or the like.

Moreover U.S. Pat. No. 5,499,563 relates to an on car disc brake lathe unit for simultaneously resurfacing of opposite sides of a brake disc for a wheel without removing the disc but only the wheel and other parts of the brake mechanism and with a device for rotating the disc comprising the housing with two synchronous sliding holders each with a tool for resurfacing a disc brake surface, a driving mechanism for the sliding holders comprising an electric motor and a gear between the electric motor and the sliding holders and an adjustable device for controlling the current to the electrical motor in relation to the position of the resurfacing tools. Such brake lathe systems disclosed in U.S. Pat. No. 5,499,163 are also adapted to roll along the floor of a building.

These and other brake lathe units are relatively bulky complicated mechanisms that tend to get in the way of a worker who is walking around a vehicle. Moreover such brake lathe units generally contribute to congest an area around the vehicle to be worked on and present obstacles in which a worker must work around.

It is an object of this invention to provide a more efficient brake lathe system that is easy to operate and to manipulate.

SUMMARY OF THE INVENTION

It is an aspect of this invention to provide an articulated arm assembly adapted to carry a machine comprising a first member, a second member pivotally connected at one end thereof to said first member for pivotal movement thereabout, a third member extending outwardly from another end of said second member, said third member including structure for connection to said machine and structure for adjusting the position of said machine means.

It is another aspect of this invention to provide an articulated arm assembly adapted to be attached to a vehicle lift and adapted to carry a brake lathe comprising a first horizontal member having one end adapted for attachment to said vehicle lift for pivotal movement thereabout, a second horizontal member having one end pivotally connected to another end of said first horizontal member, a vertical member depending substantially vertically downwardly from another end of said second horizontal member, said vertical member having another end presenting connecting means for connection of said brake lathe means to said vertical member, said vertical member including vertical height adjusting means for adjusting the height of said brake lathe means.

It is yet another aspect of this invention to provide a device for docking an articulated arm for a vehicle lift comprising means for receiving said articulated arm in a first stored position, sensing means for sensing the position of said articulated arm in said first stored position and permitting operation of said vehicle lift and for sensing the displacement of said articulated arm from said stored position and inhibiting operation of said lift.

BRIEF DESCRIPTION OF THE DRAWINGS

A detailed description of the preferred embodiment is provided herein below by way of example only and with reference to the following drawings, in which.

Figure 1:
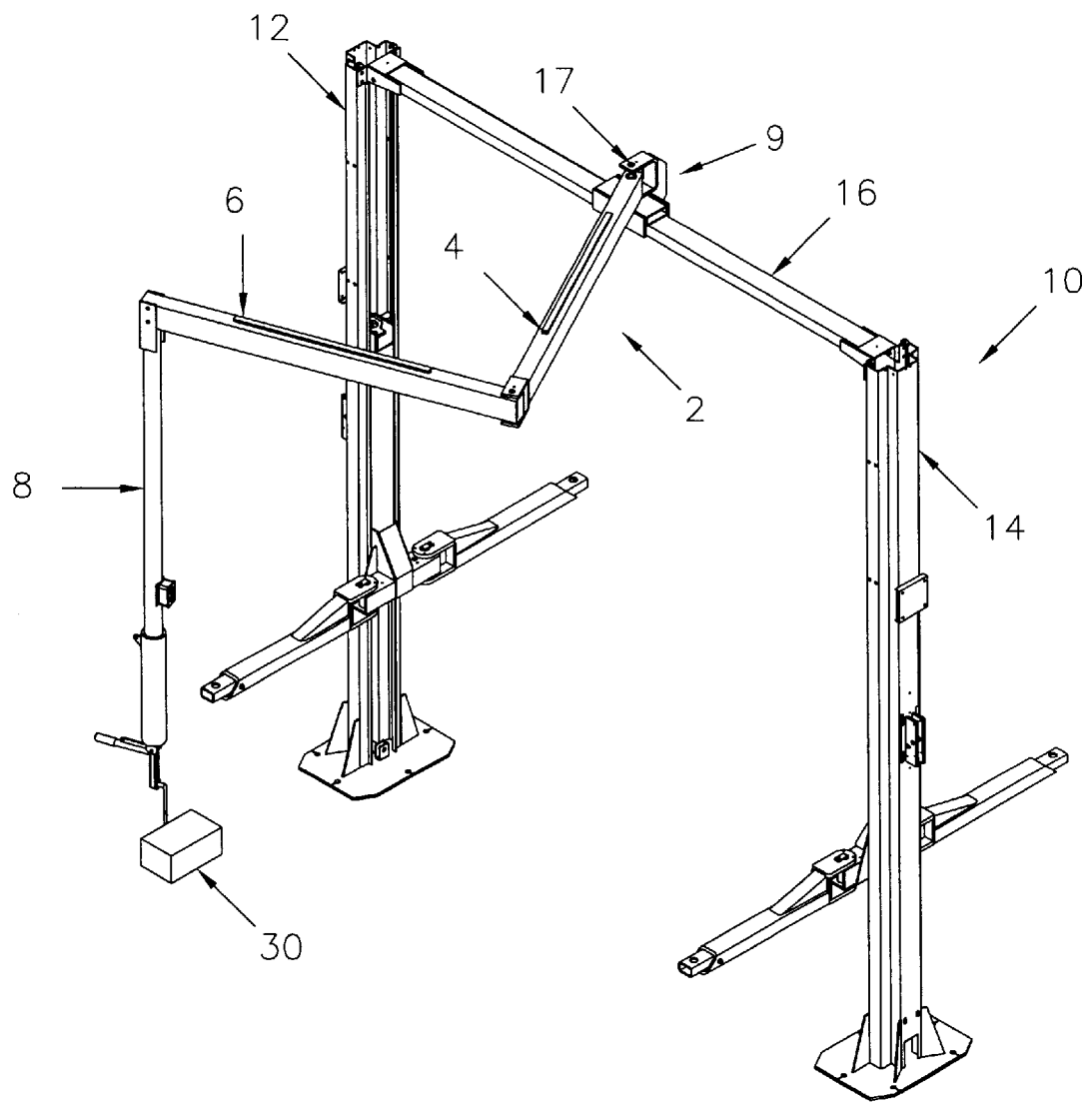
FIG. 1 is a perspective view of the brake lathe suspension arm.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

In the description that follows, like parts are marked throughout the specification and the drawings with the same respective reference numerals. The drawings are not necessarily to scale and in some instance proportions may have been exaggerated in order to more clearly depict certain features of the invention.

FIG. 1 is a perspective view of the arm or articulated arm assembly 2 to be more fully described herein. More particularly the arm 2 comprises a first member or principal beam 4, a second member or secondary beam 6 and a third member or vertical tube or beam 8.

The arm assembly 2 is secured at one end 9 thereof to a suitable support 16. The arm assembly 2 is adapted to carry a machine such as a brake lathe 30.

In FIG. 1 the articulated arm assembly 2 is secured to a two post lift 10 which comprises a first vertical post 12 spaced from a second vertical post 14. The upper portion of posts 12 and 14 are connected together by a horizontal member 16 as shown. Although the drawings show that the arm 2 is connected to a two post lift 10 and specifically to the horizontal member 16, the arm could be connected to a wall or ceiling.

The articulated arm assembly 2 is adapted to carry a machine 30 and includes the first member 4, the second member 6, which is pivotally connected at one thereof to the first member 4 and for pivotal movement thereabout, and a third member 8 extending outwardly from another end of the second member.

One end 9 of the arm 2 is secured for rotational or pivotal movement about a pin 17.

Figure 2:
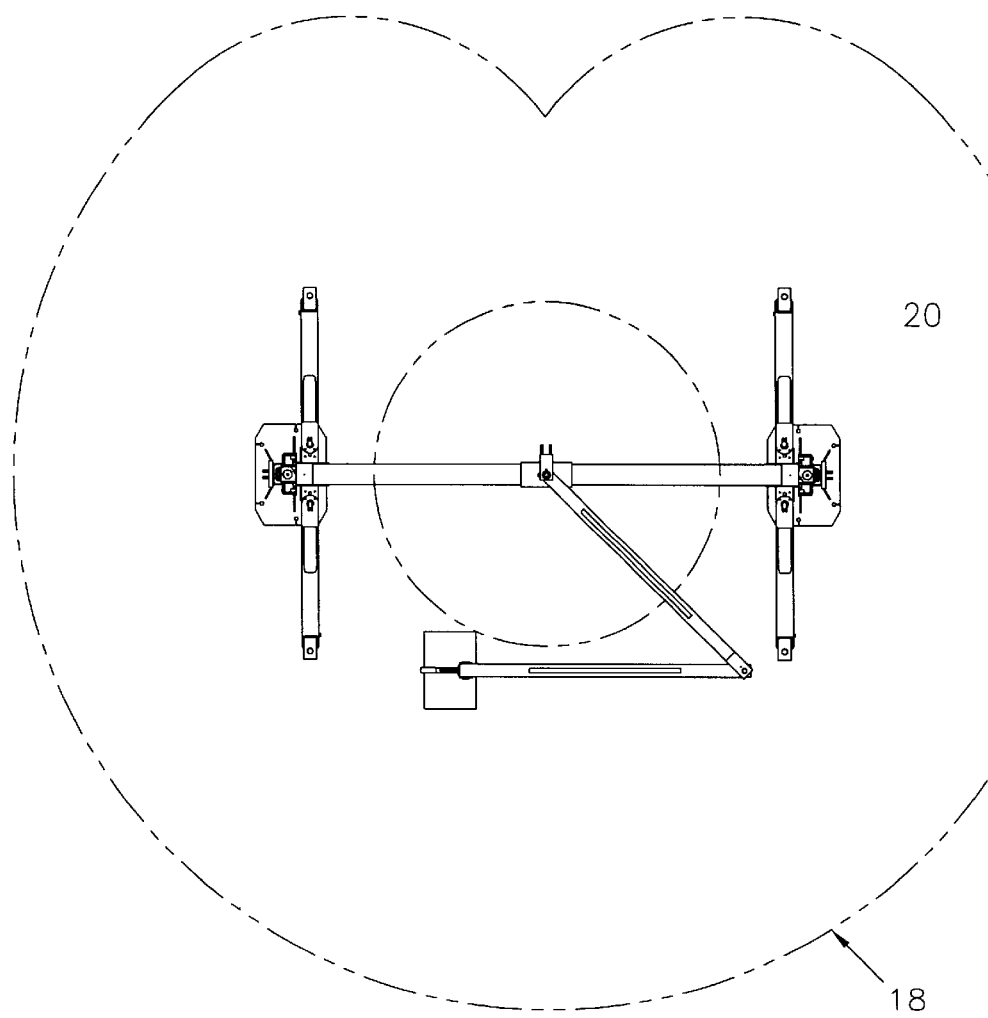
FIG. 2 is a top plane view of the brake lathe suspension arm showing the extent of travel of said brake lathe.

An example of the extent of the rotational movement of the arm 2 is shown in FIG. 2. When the arm 2 is stretched out to its fullest extent, i.e. when the principal and secondary beams 4 and 6 are substantially aligned with one another along their furthest reach the arm 2 will scribe its outer most swing along a path 18 as shown in FIG. 2. Since the arm 2 can articulate in a manner to be more fully described herein the arm 2 may also travel within the zone marked as 20 in FIG. 2. The path 18 as shown in FIG. 2 is not circular since appropriate electrical connectors or wires can be located within the beams 4 and 6 and down the tube 8 for activating the brake lathe generally illustrated as 30. In other words the arm 2 can be designed so as not to rotate beyond a 360° swing, as this will tend to wind up the electrical cord about pin 17. However it should be noted that suitable electrical connections could be made so that the arm 2 could swing beyond the 360° swing.

Figure 3:
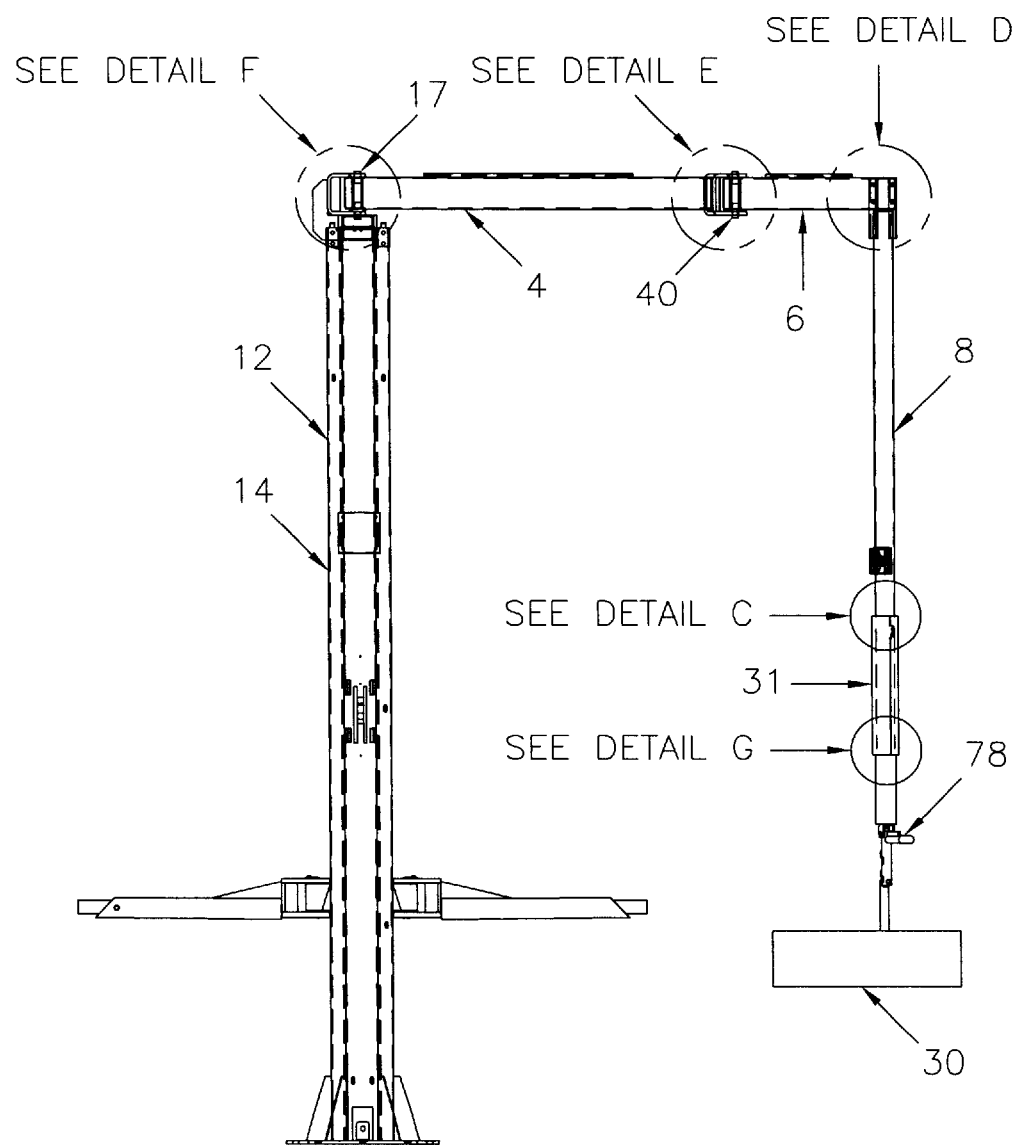
FIG. 3 is a side elevational view of the brake lathe suspension arm.

FIG. 3 illustrates a side elevational view about posts 12 and 14. In particular the first beam 4 rotates about pin 17 so as to produce a shoulder joint that is more fully particularized in FIG. 5. Spring pins 22 retain the pin 17. A washer 24 is also provided along with a washer 26 which can comprise of a bronze washer or the like. The first beam 4 is also connected to the second beam 6 by means of pin 40 so as to permit articulated movement between beams 4 and 6. The detail of pin 40 may be seen in FIG. 6 which also includes a washer 24 as well as another washer 26 which can comprise of bronze or the like and includes spring pins 22.

Figure 7:
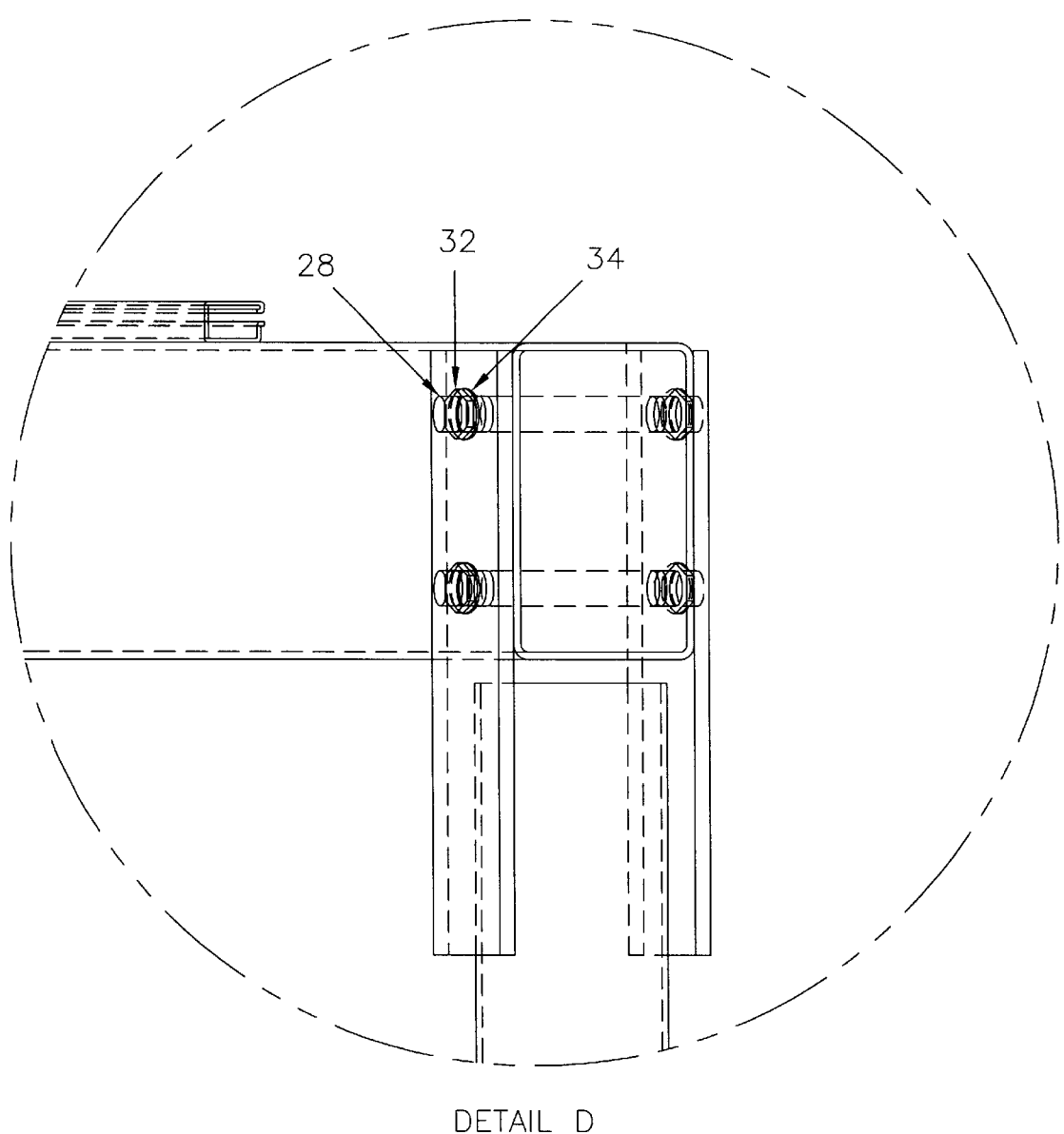
FIG. 7 is a side elevational view of detail D.

The vertical tube 8 is connected to the second beam 6 as shown in FIGS. 3 and 7. FIG. 7 shows that bolts 28 may be utilized along with nuts 32 and washers 34, to connect the tube 8 to the beam 6.

Figure 8:
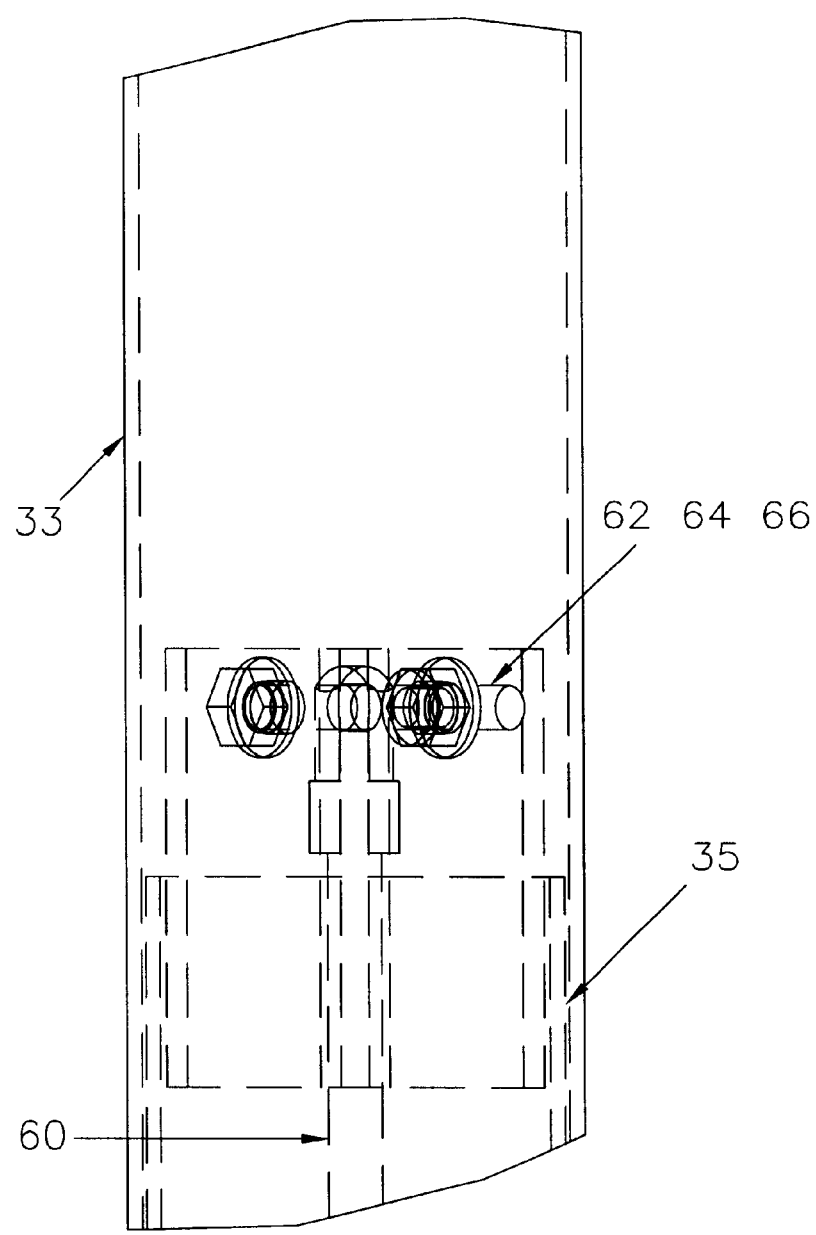
FIG. 8 is a side elevational view of detail C.
Figure 16A:
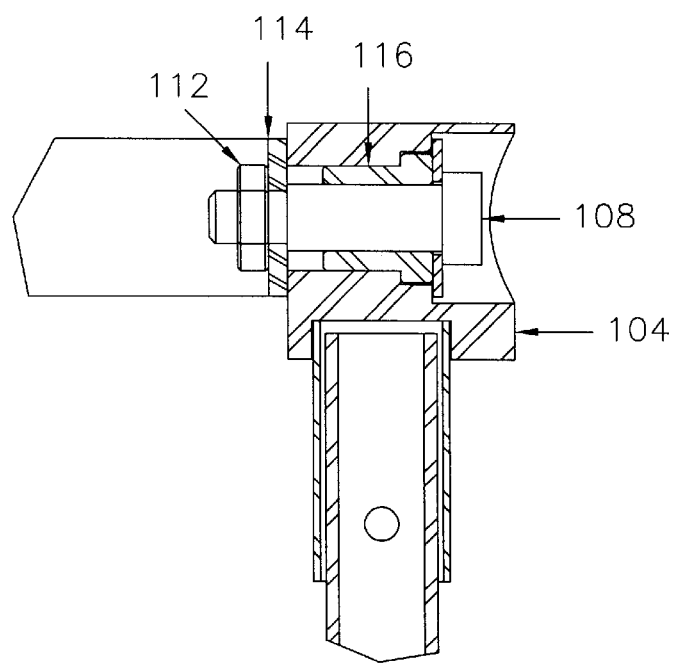
FIGS. 16(a) and 16(b) illustrate the machine mount assembly.
Figure 16B:
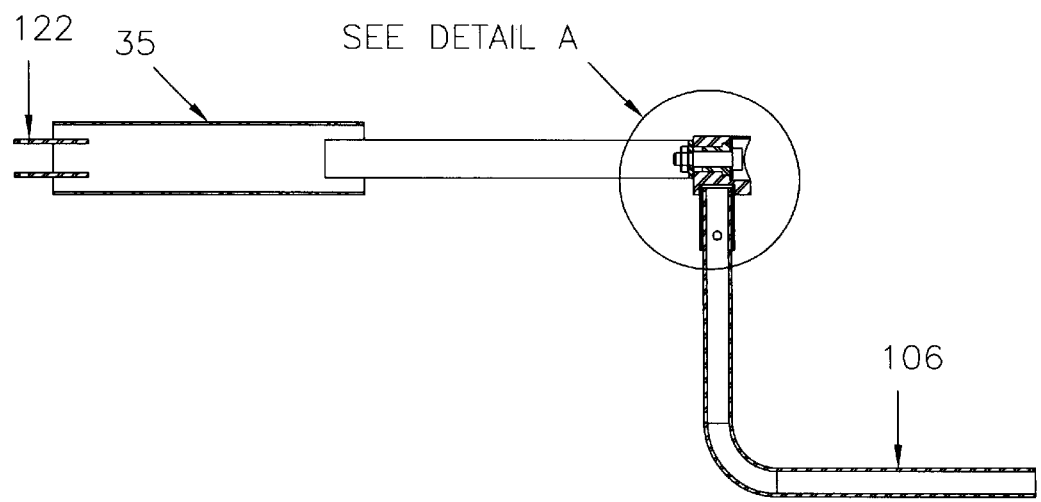

FIGS. 8 and 16b illustrates in detail the structure to connect brake lathe 30 to the lower end of beam 8. The connecting structure includes means 60 to adjust the position of the brake lathe 30, namely means to adjust the height of the brake lathe 30 relative to the reference such as the ground. Such means includes telescoping means such as tubes 33 and 35. The adjusting means 60 may include a gas cylinder which may be manipulated so as to cause the brake lathe to be adjusted up and down relative to the reference by easily pulling up or down on the brake lathe 30. The gas cylinder could be adjusted so as to permit easy manipulation of the connecting structure 31 since the gas cylinder could offset the weight of the brake lathe 30. In one embodiment the connecting structure 31 comprises telescoping tubes 33 and 35 as shown in FIG. 8. Bolts 62, nuts 64 and washers 66 can be utilized.

Figure 9:
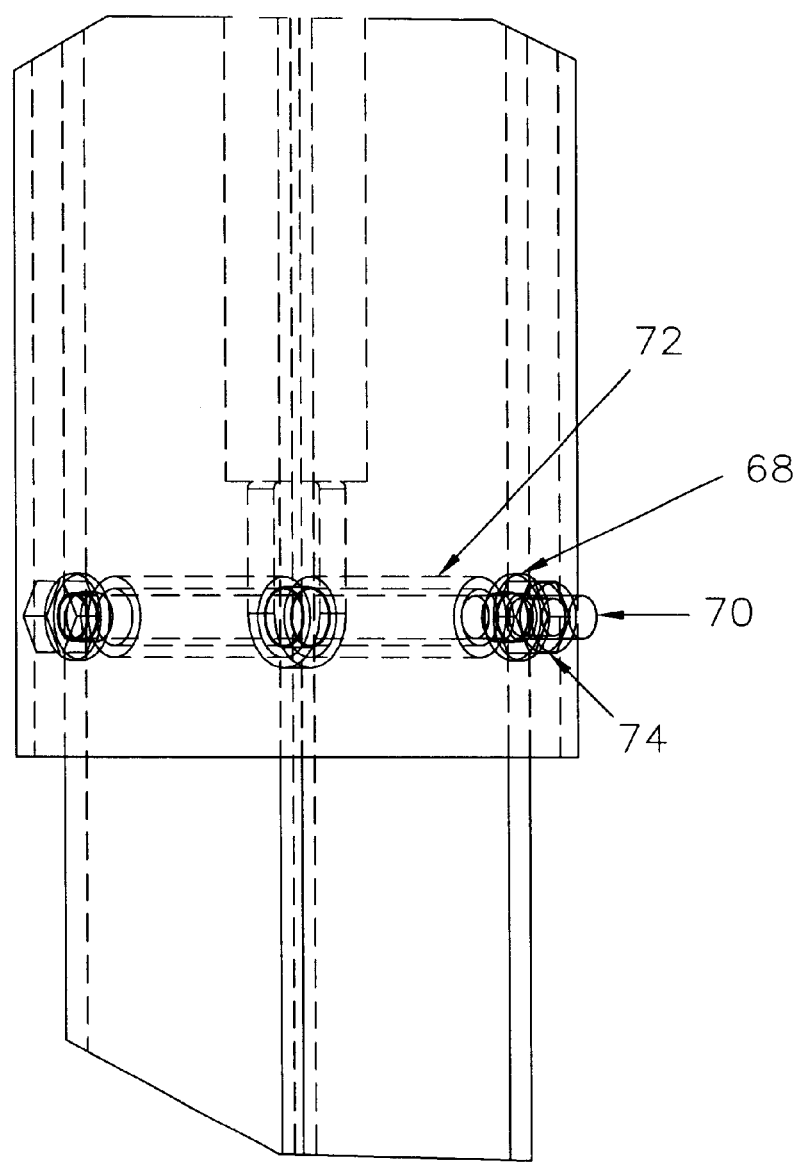
FIG. 9 is a side elevational view of detail G.

Furthermore as shown in FIG. 9 washers 68, bolts 70 and sleeve 72 can be utilized with nuts 74. However other connecting structures could be used within the spirit of the invention described herein so as to secure the gas cylinder between the telescoping tubes 33 and 35 so as to permit height adjustment therebetween.

Figure 4:
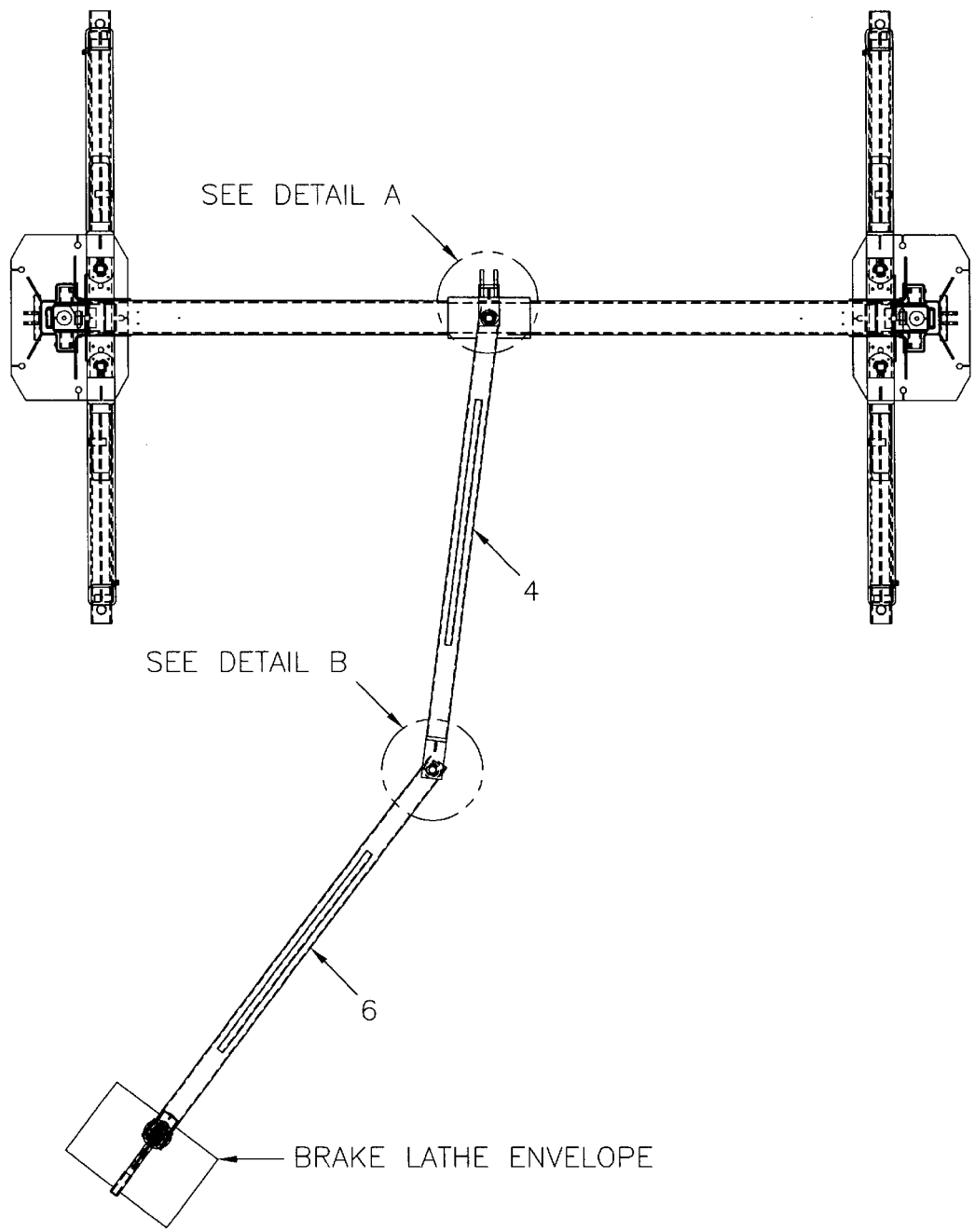
FIG. 4 is a top plan view of said brake lathe suspension arm.
Figure 10:
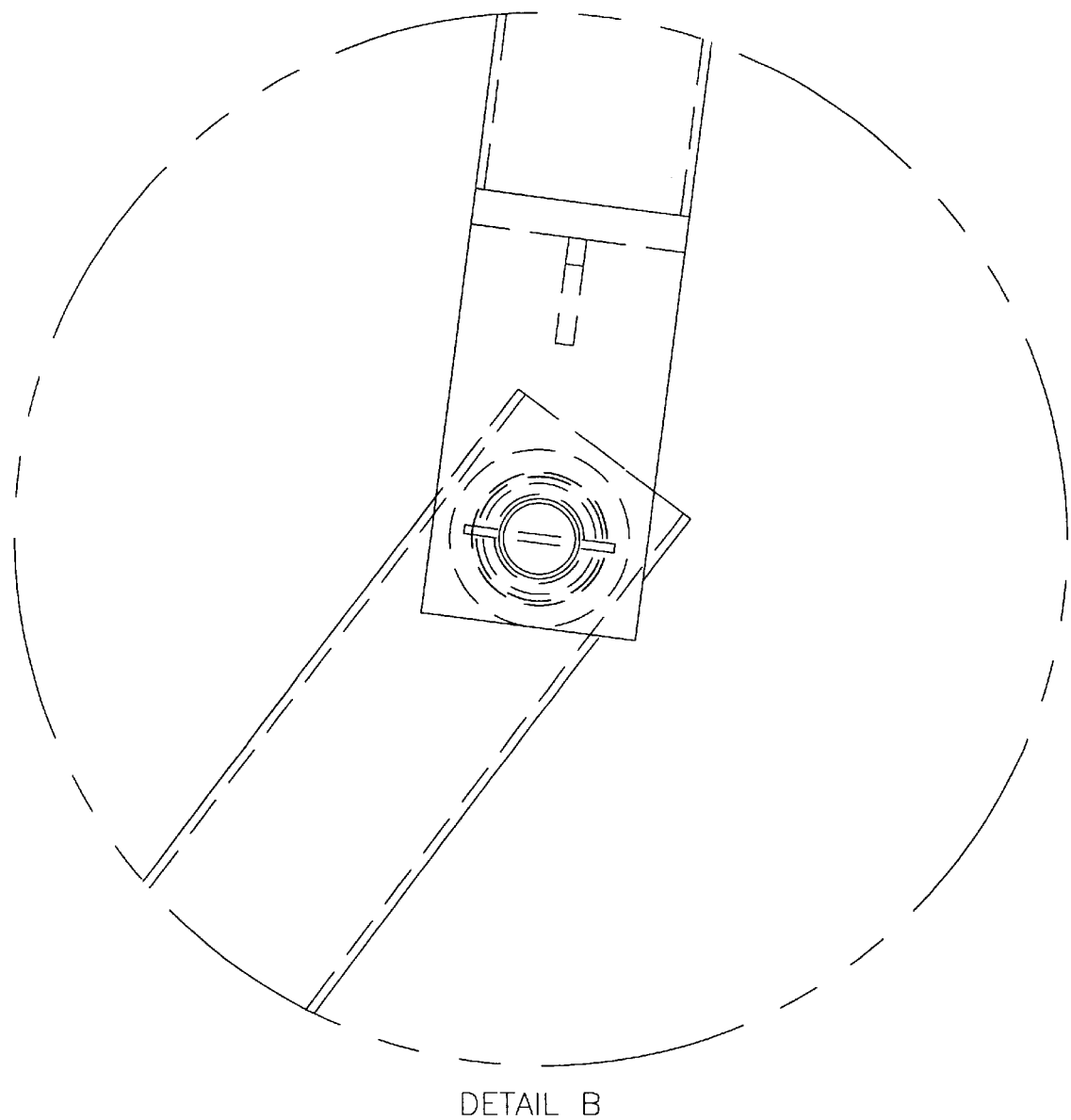
FIG. 10 is a top plan view of detail B.
Figure 11:
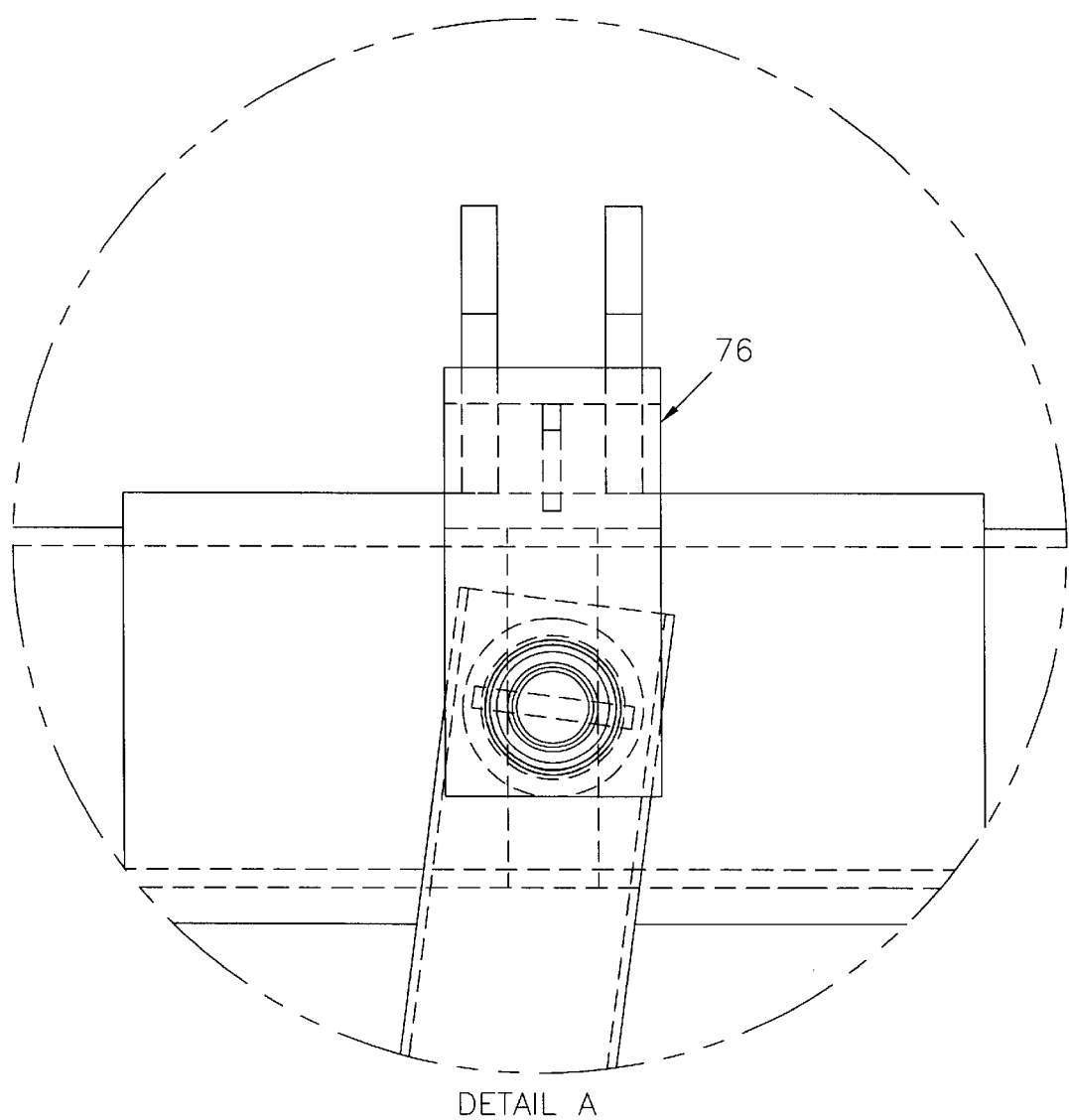
FIG. 11 is a detailed view of detail A.

FIG. 10 illustrates in detail the top plan view of section B as shown in FIG. 4 while FIG. 11 illustrates in detail the structure of detail A shown in FIG. 4. In particular FIG. 11 shows a shoulder joint weldment illustrated by numeral 76 for providing a base for articulated movement of the principal beam 4 about pin 17.

FIG. 3 also shows the machine mount assembly 78 for mounting the brake lathe 30 to the beam 8.

Figure 12:
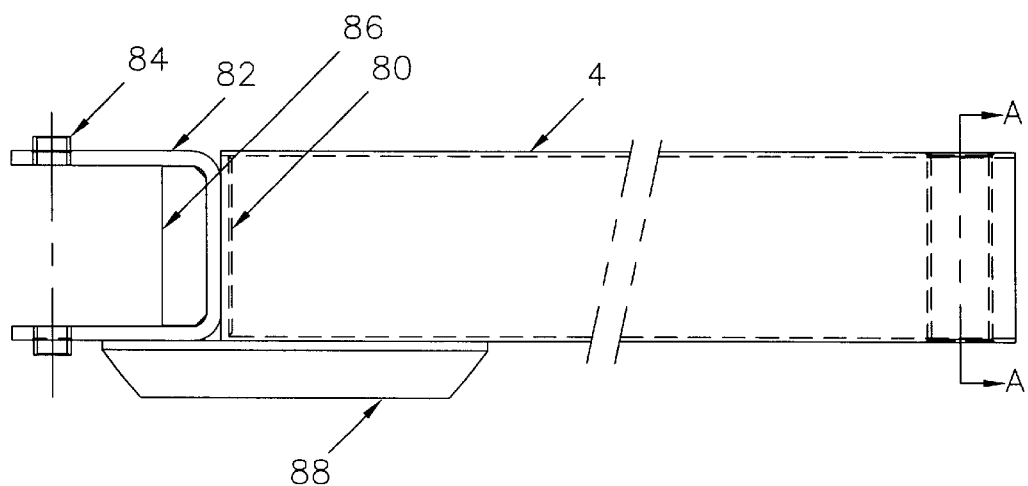
FIG. 12 is a partial view of the principal beam.

FIG. 12 illustrates the principal beam 4 having a cap plate 80, bracket elbow joint 82, cap bushing 84, rib-mouth 86. FIG. 12 is a slightly different embodiment of the beam 4 of FIG. 6. The beam of FIG. 12 includes rib-elbow 88. Cap bushing 84 is adapted to receive pin 40 to permit rotational movement of beam 6 about beam 4.

Figure 13:
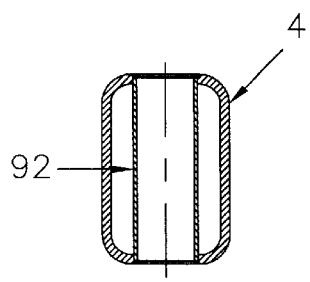
FIG. 13 is an end view of FIG. 12.

FIG. 13 illustrates the principal beam 4 having a bushing-elbow 92 which is adapted to receive pin 17. The secondary beam 6 also uses a bushing of the form illustrated by 92.

Figure 14A:
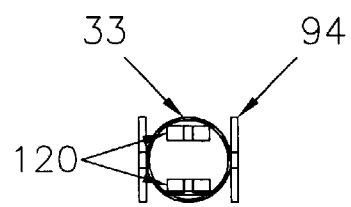
FIGS. 14(a) and (b) are views of the vertical tube weldment.
Figure 14B:
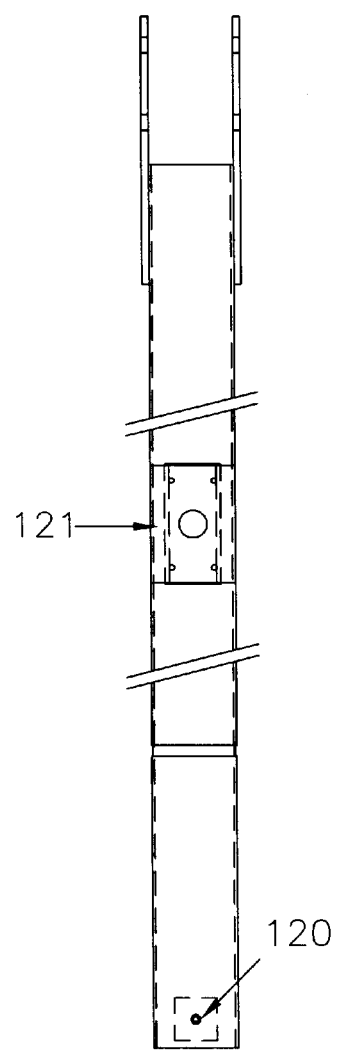

FIG. 14 illustrates the vertical tube weldment or telescope 33 having plates 94 as shown. The plates 94 each have two holes therethrough which are adapted to receive bolts 28 for connection to secondary beam 6.

FIG. 14 also shows an electrical receptacle plate 121 which is suitable to attach an electrical receptacle to provide electrical power to the brake lathe 30 or other machines such as vacuums or the like. A vacuum could be used to vacuum up metal chips from the brake lathe 30.

Figure 5:
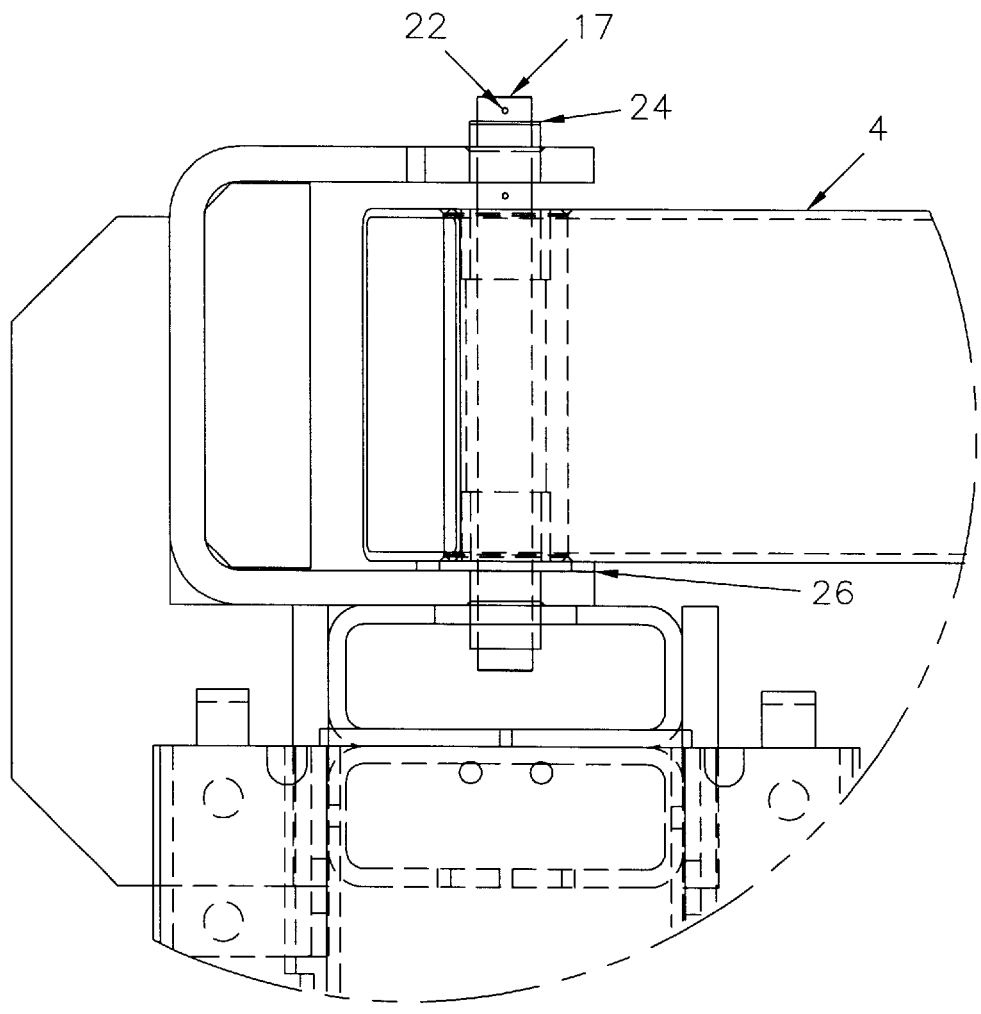
FIG. 5 is a side elevational view of detail F.
Figure 15A:
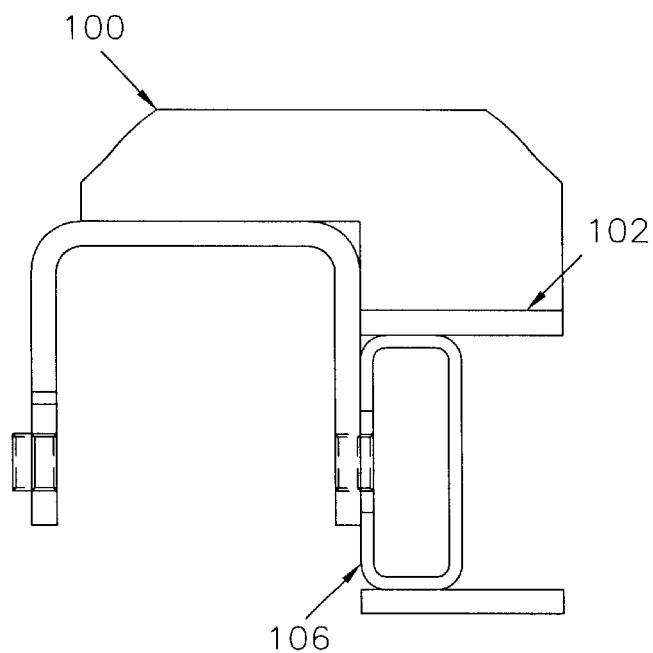
FIGS. 15(a) and (b) are views of the shoulder joint.
Figure 15B:
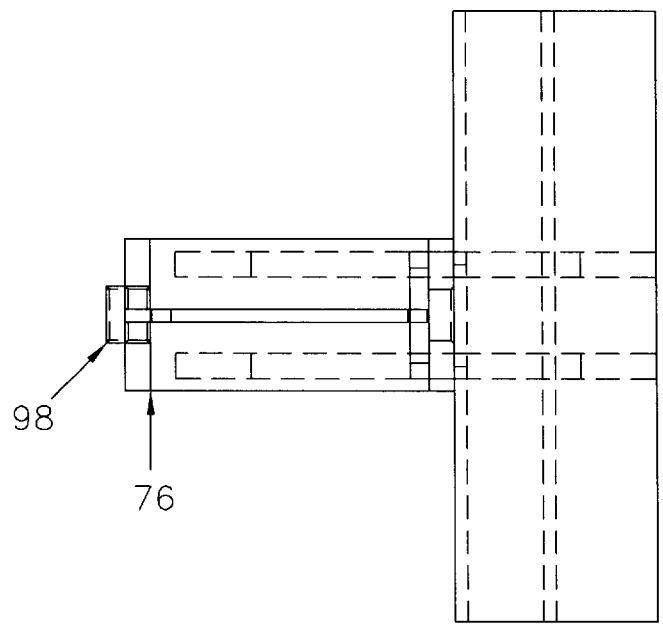

FIGS. 15a and b illustrate the side and top views of the shoulder joint weldment 76, which is seen, assembled in FIG. 5. The shoulder joint weldment has cap-bushing 98, plate or gusset 100, plate 102 and tube spacer 106.

FIGS. 16a and 16b illustrate the machine mount assembly 78 having tension tube weldment or telescope 35, with connect block weldment 104, pipe arm 106 for attachment to the brake lathe 30. Shoulder bolts 108 with jam nuts 112 may be utilized with washers 114 and drill bushings 116. The machine 30 can rotate about axis of shoulder bolt 108 through the connection 106. This assists in the positioning of the machine 30 to the wheel of the vehicle.

Figure 17:
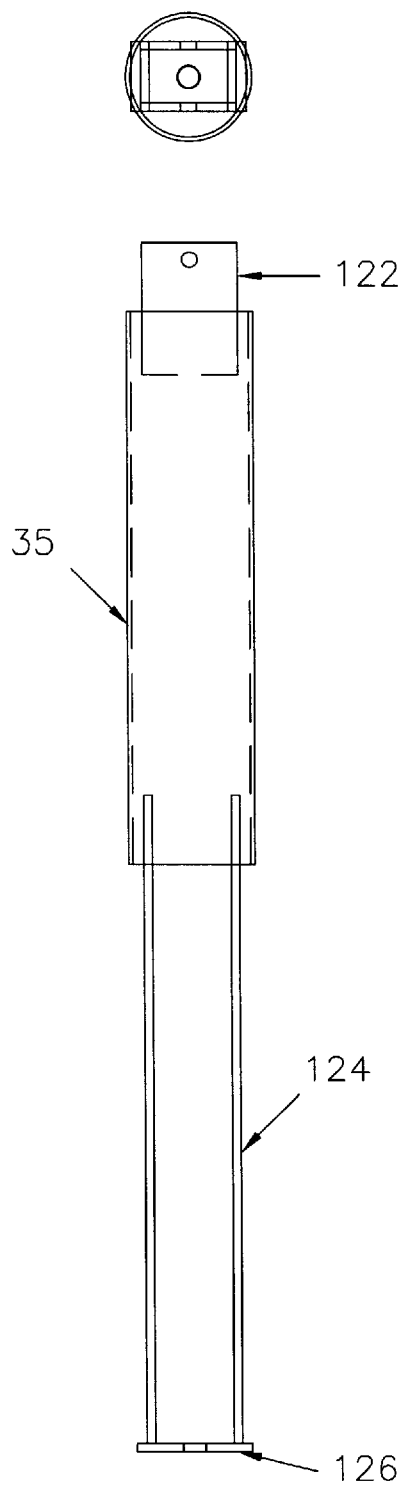
FIG. 17 illustrates the tension tube.
Figure 17A:
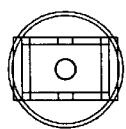
Figure 17B:
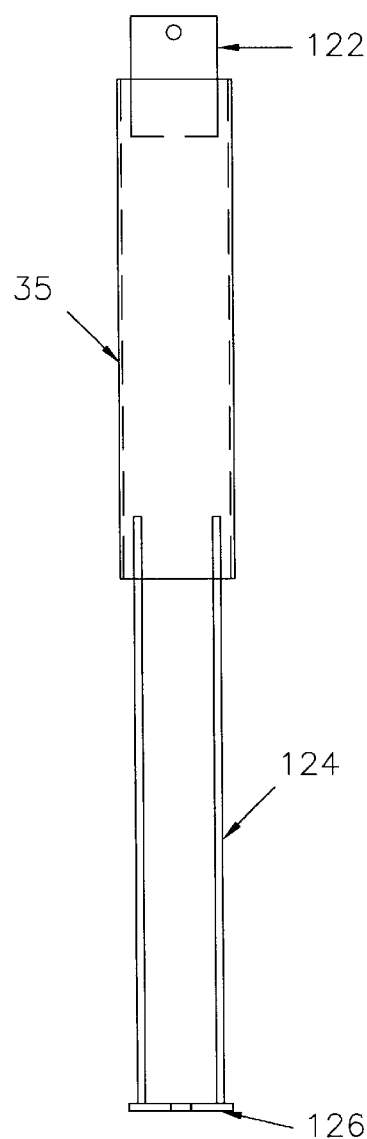

FIG. 17 illustrates a tension tube weldment or telescope tube 35 having plates 122 and plates 124 and 126.

Figure 18:
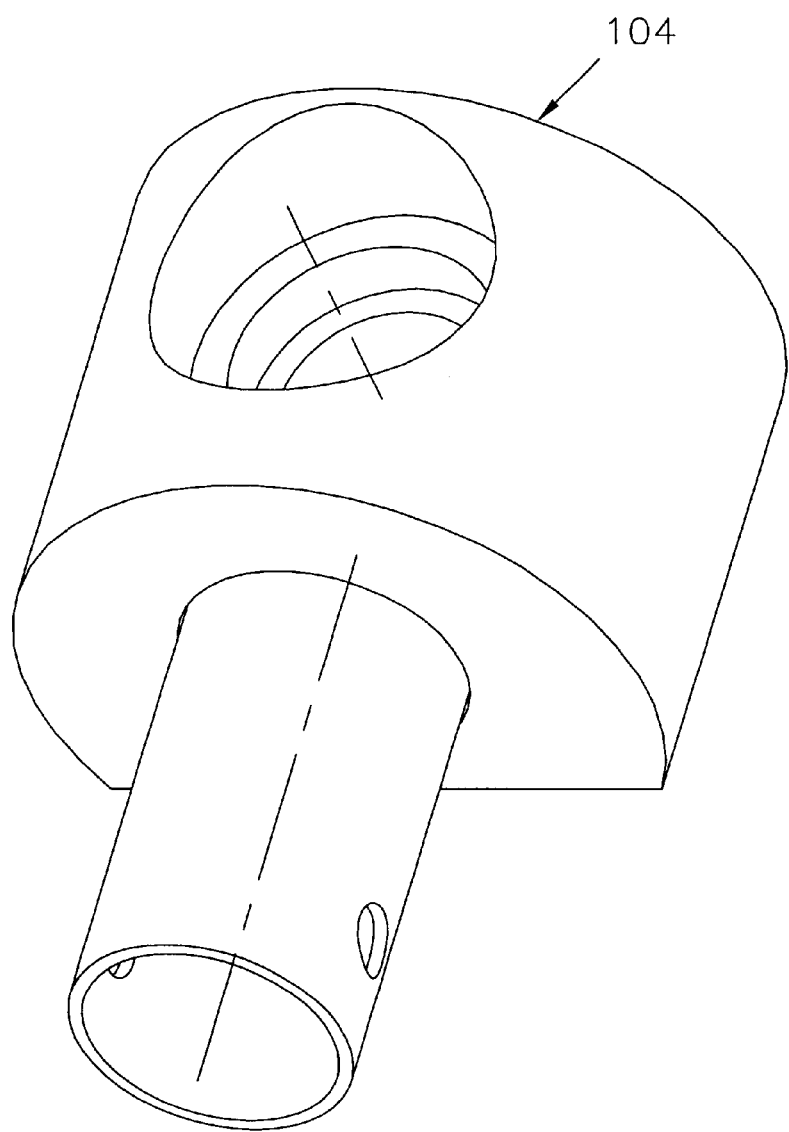
FIG. 18 illustrates the connect block weldment.

The connection block 104 is shown in FIG. 18.

As can be seen from FIGS. 8, 9, 14 and 17, the telescoping tube 35 fits within telescoping tube 33 and the top of the gas cylinder or shock 60 is attached to plates 122 of telescoping tube 35 by means of bolts 62, nuts 64 and washers 66, while the other or bottom end of the gas cylinder 60 is attached to mounting plate 120 of telescoping tube 33. Plate 126 is adapted to receive the connection block 104 as shown in FIG. 16b.

In operation the brake lathe 30 may be swung around the automobile in order to service brakes. In particular an automobile may be lifted by a lift shown in the drawings. Once the wheels are taken off the vehicle, the brake lathe 30 may be swung around to the appropriate position as illustrated in FIG. 2 so as to be adjacent next to the rotor or brake drum of an automobile. The brake lathe may then be adjusted at the appropriate height by simply manipulating the brake lathe and the rotor as required. In other words one moves the brake lathe up or down which causes the telescoping means 33 and 35 to slide relative to one another and the gas shock 60 contracts or expands and tends to fix the vertical position once released. This structure provides the means for adjusting the position of the machine 30. Thereafter an operator may manipulate the lathe by swinging the arm 2 to the next brakes to be serviced in an easy and efficient manner. Since the arm 2 is suspended from above the floor remains relatively clean and uncluttered.

The arm as disclosed herein is attached to the horizontal member 16. The arm as shown is fixedly secured for pivotal movement about pin 17.

However the spirit of the invention could include an arm which slides along the horizontal member 16 although in the preferred embodiment it is fixed. Furthermore it is possible that the swinging arm may be secured to other structures such as a wall, ceiling, or the like although the preferred embodiment is in connection with the two-post lift as shown.

Figure 19:
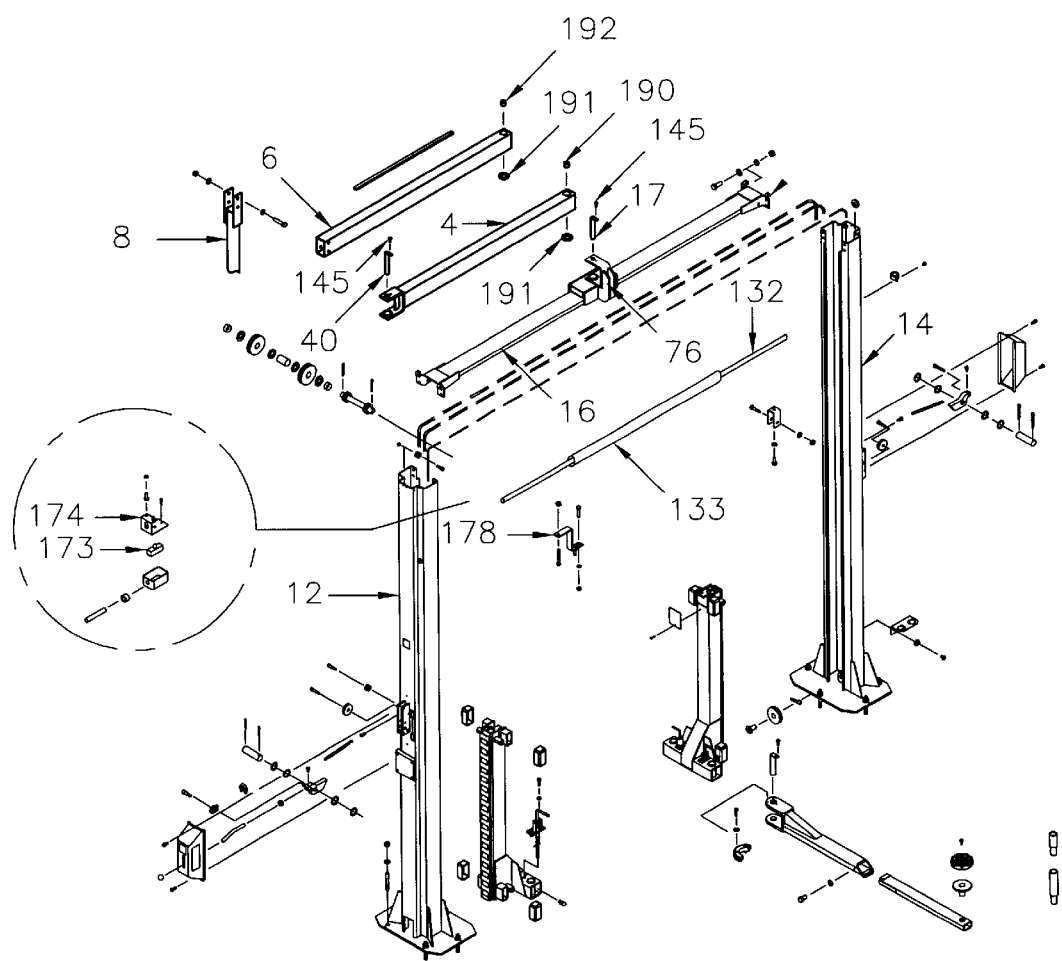
FIG. 19 is an exploded view of an embodiment of the invention.

FIG. 19 is an exploded view of an alternative embodiment of the brake lathe suspension arm attached to the lift. FIG. 19 illustrates the first vertical post 12 or tower weldment/power side 12 as well as a second vertical post 14 or tower weldment/slave side 14 which are connected together by the horizontal or cross-member 16. FIG. 19 also illustrates that the principal or primary arm 4 and the secondary arm or beam 6 as well as the vertical tube or beam 8.

Although FIG. 5 shows the use of spring pins 22 to retain the pin 17, FIG. 19 shows an alternate embodiment where the pin 17 may be retained by hex bolt 145 which is adapted to extend through an extension of pin 17 and into the crossbar connecting bracket or shoulder joint weldment 76.

Figure 6:
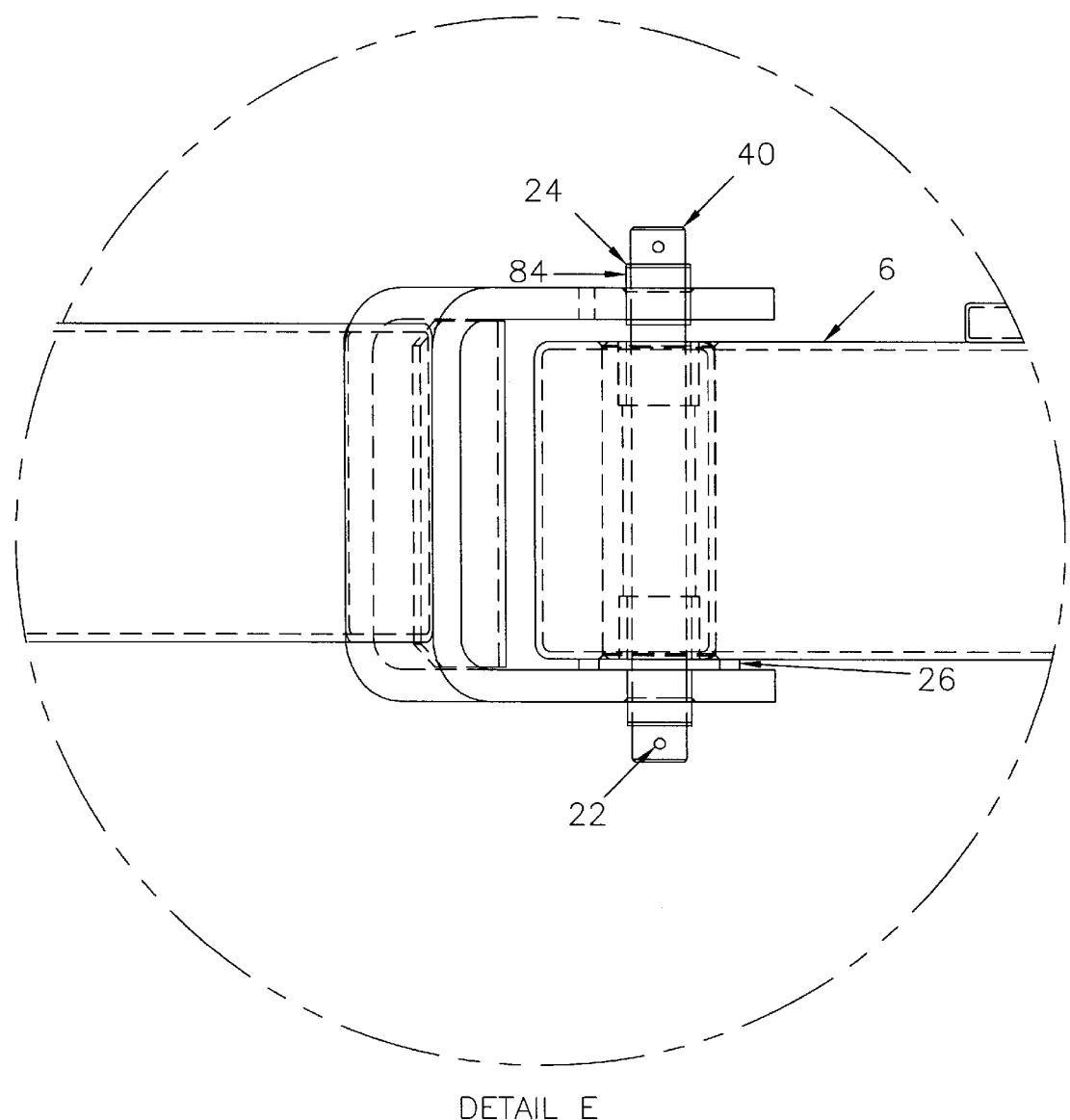
FIG. 6 is a side elevational view of detail E.

One end of the arm 4 is adapted for rotational movement about pin 17. As illustrated in an alternative embodiment shown in FIG. 19, bushing 190 and roller bearing 191 may be utilized. The other end of primary arm 4 is rotatably connected to the second beam 6 by means of pin 40. The secondary beam 6 may alternatively include roller bearing 191 and bushing 192, which are adapted to receive, pin 40. Furthermore pin 40 may be secured to the primary arm by means of the hex bolt as described above. Alternatively FIG. 6 shows the use of spring pins.

Figure 20:
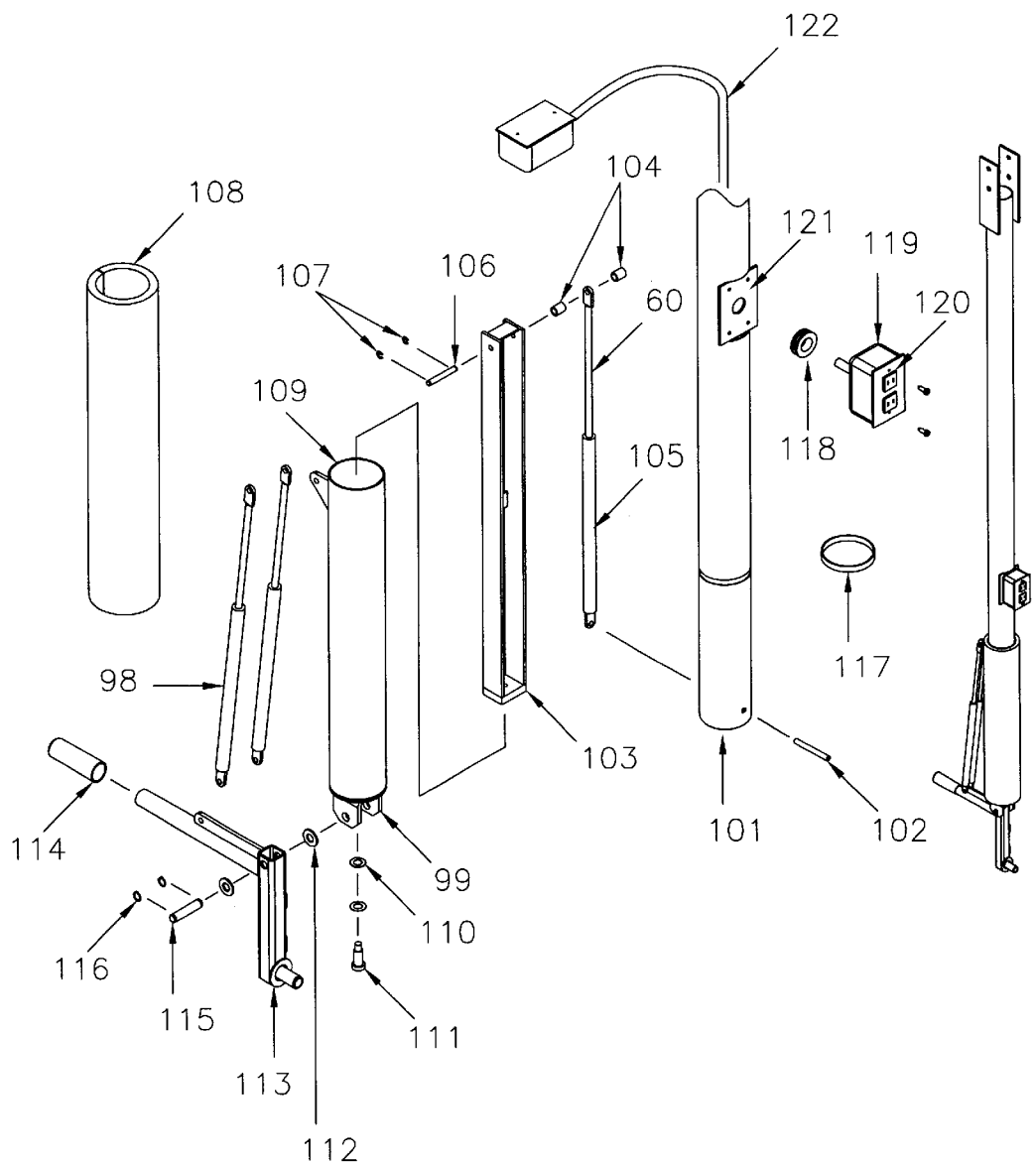
FIG. 20 is a partial exploded view of another embodiment of the vertical tube.

The connection of the vertical tube 8 to the secondary arm 6 is also illustrated in FIG. 19 while the component parts are shown in FIG. 20.

FIG. 20 illustrates the invention wherein the vertical member or beam 8 is comprised of a vertical tube weldment 101, which is telescopingly received within slider tube weldment 109. The height adjusting means 60 comprises of the telescoping sliding action of the vertical tube weldment and slide tube weldment as well as the gas cylinder or shock 105 which is retained within a saddle weldment 103. In particular one end of the gas cylinder or shock 105 is connected to the upper portion of saddle weldment 103 by means of utilizing an upper cylinder pin 106 and snap rings 107. The upper cylinder pin 106 is adapted to be received by upper pin spacers 104. The saddle weldment 103 is adapted to be received within the slider tube weldment 109 as shown.

The upper end of the cylinder 105 is secured to the upper end of saddle weldment 103. The lower end of saddle weldment 103 is secured to the lower end of the slider tube weldment by means of the shoulder bolt 111, thrust washers 110. The bolt 111 is adapted to be received by a suitable top hole at the bottom of the saddle weldment 103. The lower end of the gas cylinder 105 is connected to the lower end of vertical tube weldment 101 by means of pin 102. While the lower end of the shock 105 is secured by means of a lower cylinder pin 102 as shown so as to permit telescoping slideable movement between the vertical tube weldment 101 and the slider tube weldment 109. The shock 105 will expand and contract within the confines of weldment 103 and once released will tend to hold its vertical position In other words the tension of the shock 105 is selected for the weight of the machine 30, so as to retain the position or height of the machine 30 one the user releases same.

A foam guard 108 is used to protect a vehicle from damage and is adapted to embrace the outer surface of slider tube weldment 109. The slider tube weldment 109 is adapted to receive the lower end of the vertical tube weldment 101. A wear ring 117 is utilized as shown so as to minimize frictional wear caused by relative slideable movement between the vertical tube weldment 101 and slider tube weldment 109.

The lower end of slider tube weldment 109 includes a fork 99 having holes therethrough which are adapted to receive a track roller shaft 115, slot washers 112 and two circlips 116. The track roller shaft 115 is adapted to pivotally connect the pivot arm 113 to the fork 99. The pivot arm 113 is adapted to be connected to the brake lathe 30. The pivot arm 113 also includes a foam grip 114.

A user may adjust the vertical height of the brake lathe 30 by moving the telescoping means up or down since the gas cylinder 105 may be selected to permit easy manipulation of the machine to the appropriate height.

Figure 21:
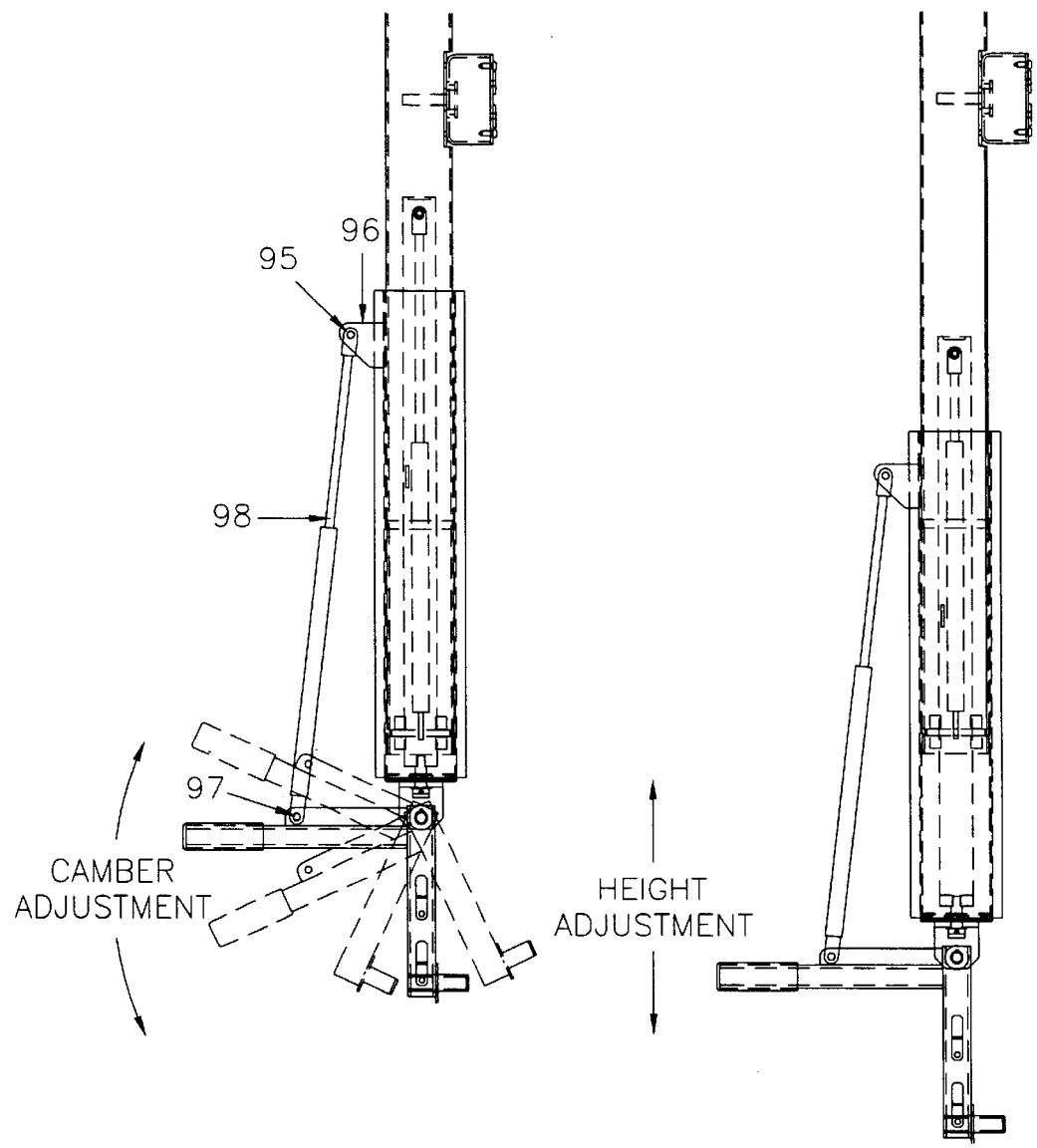
FIG. 21 is a side elevational view of the vertical tube.
Figure 22:
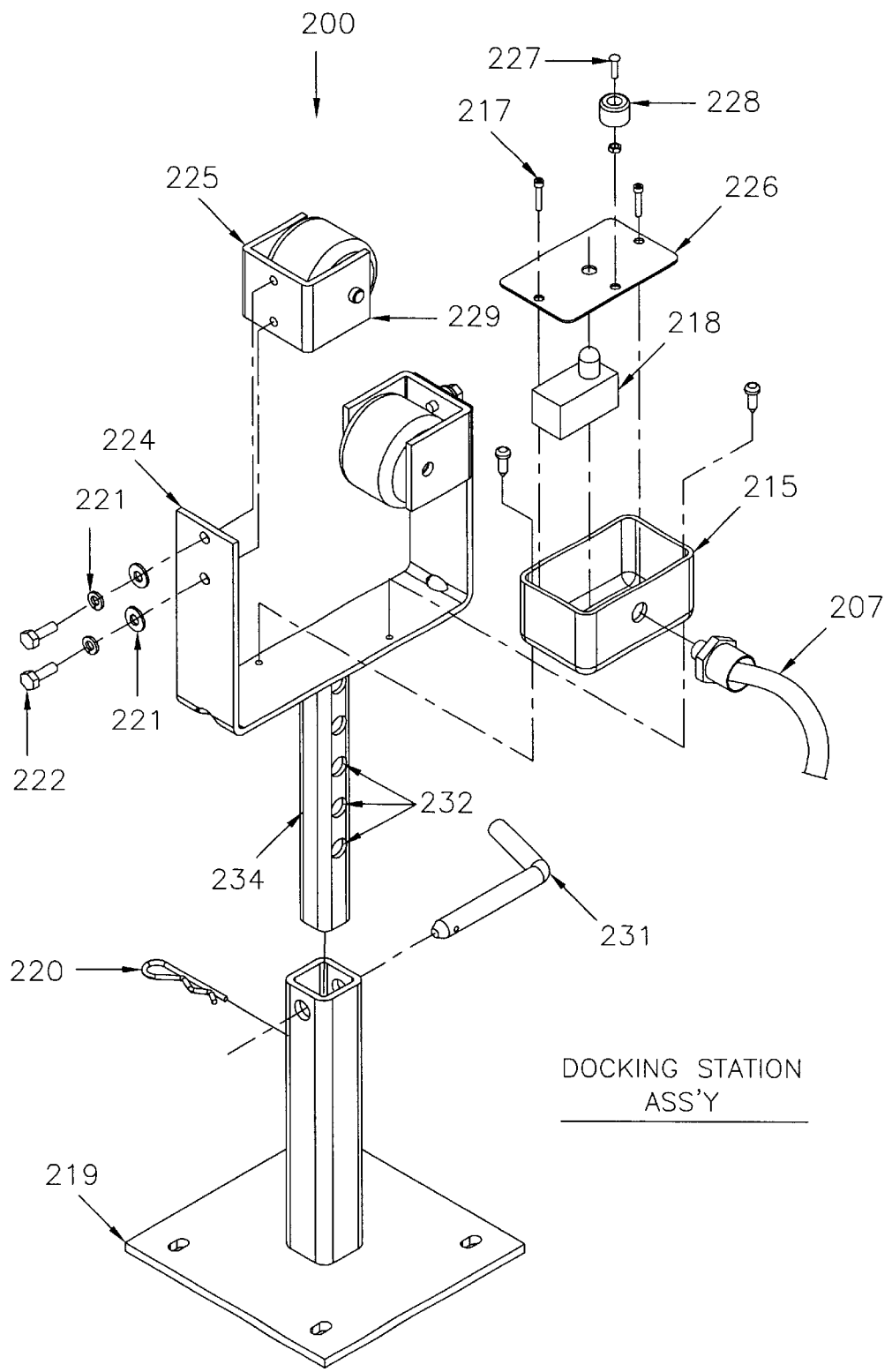
FIG. 22 is an exploded view of the docking station assembly.

The adjusting means as shown in FIGS. 20 and 21 may also include a second tilt adjusting means comprising of a pair of second gas cylinders 98 extending between the pivot arm 113 and the slider tube weldment 109. In particular the pivot arm 113 includes a hole 97 adapted to secure one end of the second gas cylinders 98, while the slider tube weldment 109 includes an extension 96 including a hole 95 therein which is adapted to receive the other end of the second cylinders 98. Although two cylinders are shown, any number of gas cylinders could be used within the spirit of this invention, including one.

Accordingly the user when manipulating the vertical height adjusting means may also grab the foam grip 114 and either lift or lower the arm therein so as to more precisely locate the brake lathe against an appropriate position of a wheel. The user may also cause the brake lathe carriage to tilt relative to the vertical axis as shown by the hidden lines in FIG. 21 so as to accommodate the repositioning of a wheel as the vehicle is lifted off the ground. More precisely the wheels on a vehicle are generally orientated generally vertically relative to the ground with the appropriate camber and caster angle imparted therein due to the weight of the vehicle. As the vehicle is lifted off the ground by the lift it is not unusual for the wheels to tilt relative to the vertical. Accordingly the second adjusting cylinders 98 become useful in adjusting for such angle, in which case the user can move the grip 114 so as to align the pivot arm 113 with the axis of the wheel.

The fork 99 also includes the appropriate hole which extends to the lower part of saddle weldment so as to receive the shoulder bolt 111 as well as thrust washers 110 as described above, so as to connect forks 99 and slider tube weldment 109 to saddle weldment 103.

The vertical beam 8 also includes an electrical utility box 119, which is suitably connected to the vertical tube weldment 101. A rubber grommet 118 may be utilized. Suitable cables 122 may be used to connect the receptacle 120 to an electrical utility box 119 to provide power to the receptacle 120. The electrical receptacle 120 is used to supply power to the lathe although it may be utilized to connect a vacuum so as to vacuum up waste products from a wheel or to plug in an electrical light or other utility.

Moreover the telescoping means may also include a tray (not shown) which may be utilized to collect metal chips which are produced from the brake lathe in a fashion well known to those persons skilled in the art.

The brake lathe carriage is connected to the pivot arm weldment 113.

Moreover the slider tube weldment 109 is also rotatably moveable relative to the vertical tube weldment 101. In other words not only can the slider tube weldment 109 move telescopingly relative to the vertical tube weldment 101 but it may also rotate relative thereto about a common axis about shoulder bolt 111. This also facilitates the alignment of the brake lathe carriage relative to a wheel of an automobile.

The brake suspension arm 2 described herein also includes safety devices. A docking station assembly 200 is attached to one of the vertical posts 12 or 14 by means of a plate 219 having holes therethrough. The docking station assembly 200 is adapted to receive the vertical tube or beam 8 within the roller assemblies 225 so as to engage the limit switch 218. So long as the limit switch 218 is engaged by the vertical arm 8, the lift can be energized so as to either lift a vehicle off the ground or to lower the vehicle from a raised position down towards the ground. If the vertical tube or beam 8 is not within the docking assembly 200, the limit switch 218 is not engaged and accordingly the lift may not be powered so as to either lift or lower a vehicle. This minimizes the possibility of having the brake lathe catastrophically contact or impede the lifting or lowering of a vehicle. In extreme cases if the lift could be operated without the arm being in the docking station, the brake lathe could damage the car or cause the vehicle to fall off the lift. Therefore the docking station 200 is utilized.

The docking station 200 includes an adjusting pin 231 which is adapted to engage holes 232 of extending member 234 so to adjust the proper extent of the docking station 200 away from the vertical post 12 or 14. A hitch pin 220 is used to secure the pin 231. The fork 224 of the docking station 200 includes two roller assemblies 225 which are adapted to catch and embrace the vertical tube or beam 8. The lower end of the fork 224 includes a utility box 215 adapted to receive electrical cable 207 so as to power the limit switch 218. A limit switch mounting plate 226 is utilized having the appropriate aperture so as to receive limit switch 218 as shown. Utility box screws 217 are used to secure the limit switch mounting plate 226 to the utility box 215. A bumper 228 is secured by means of a screw 226. The bumper may be utilized so as to minimize damage to the limit switch 218 and the vertical tube 8 as the vertical arm 8 contacts the limit switch 218. The roller assemblies 225 are secured as shown by means of roller arm brackets 229, bolts 222 and flat washers 221.

Figure 23:
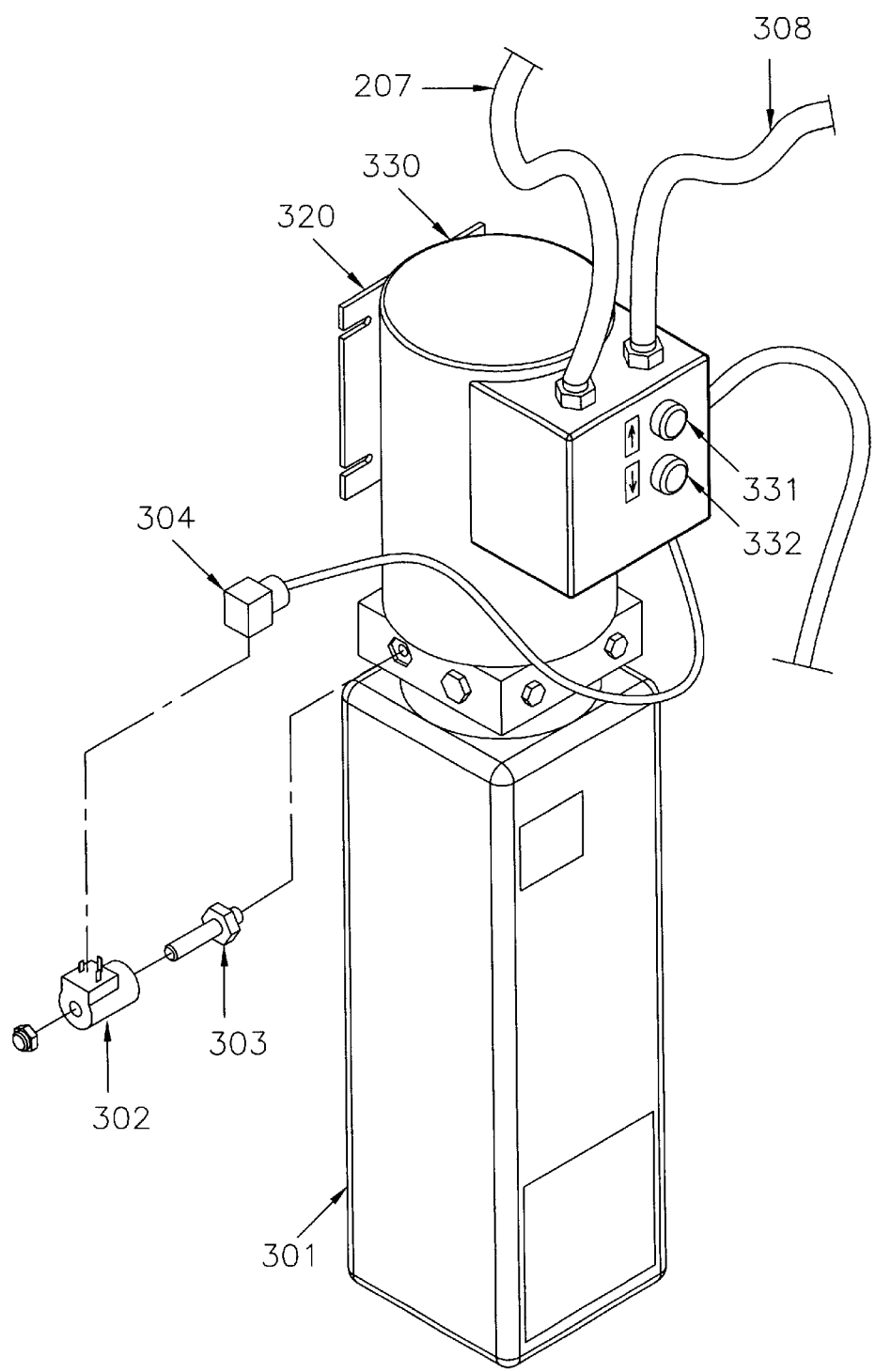
FIG. 23 a perspective view of the power pack.
Figure 24:
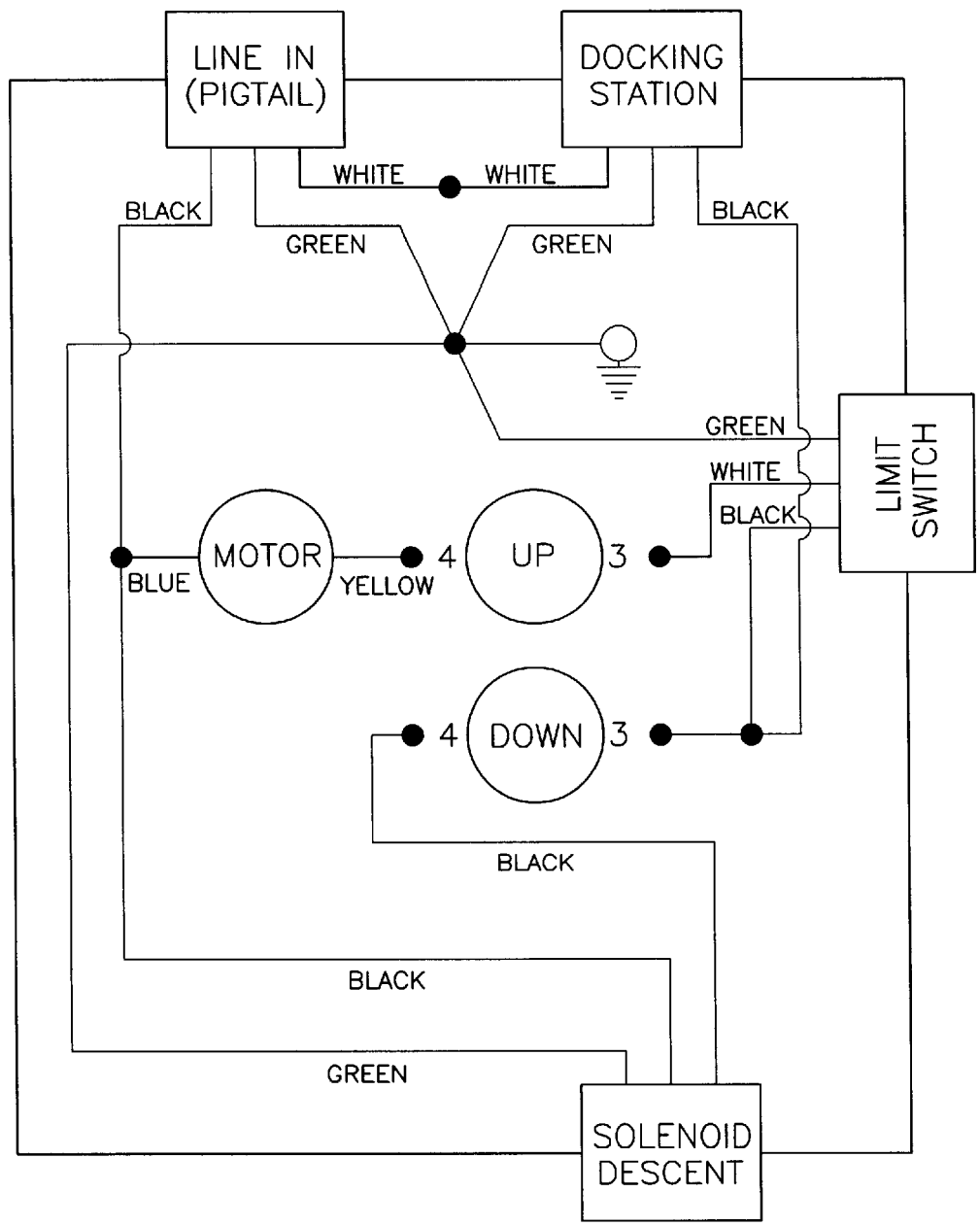
FIG. 24 is an electrical diagram.
Figure 25:
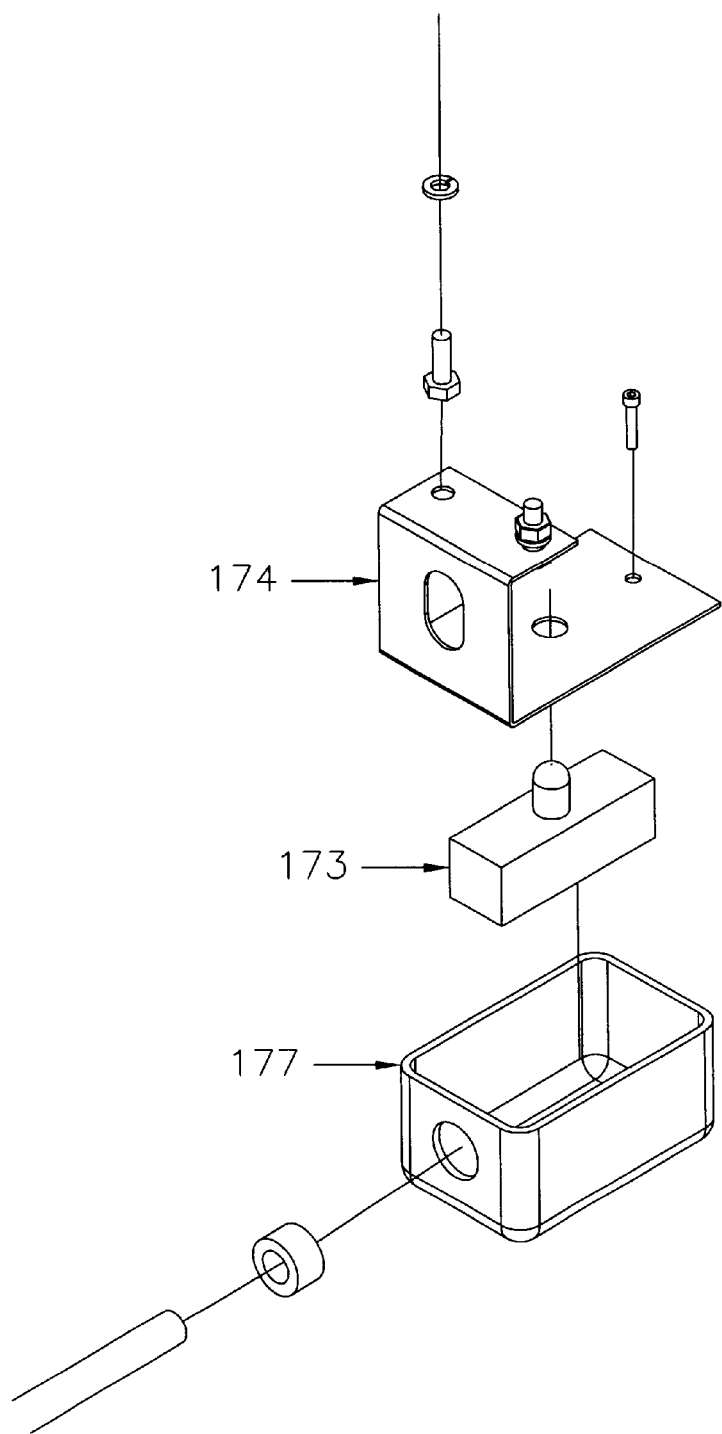
FIG. 25 is an exploded view of the microswitch assembly used in connection with the shut-off bar.

The cable 207 communicates with the power pack assembly shown in FIG. 23.

The power pack assembly 301 is adapted to be attached to the other one of the vertical posts 12 or 14 by means of bracket 320. The power pack assembly 301 includes a motor 330 which is activated by the up buttons 331 and 332. The down button 332 activates the appropriate fluid through solenoid valve 302 and spool valve 303. The appropriate electrical connector 304 is attached to the solenoid valve 302 for activation thereof.

Electrical power is supplied to the power pack unit 301 by means of cable 308 which activates the motor 330 by pressing uplift button 331. The down lift button does not activate the motor but rather solenoid 302. An electrical cable 207 communicates with the docking station 200.

As can be seen from FIG. 23 and electrical diagram 24, the lift can not be moved up or down unless the vertical beam 8 contacts the limit switch 218 as described above.

Another safety feature utilized herein includes a shut-off bar which is disposed near the top of the vertical post 12 and 14. The shut-off bar 132 as shown in FIG. 19 is spaced from and adapted for pivotal connection at one end thereof to connecting bar 16. The other end of the shut off bar has attached thereto an actuator extension 178 which is adapted to shut off the lift in the event the vehicle lifting carriage goes to full stroke to prevent over powering the power pack assembly and lifting cylinders. In other words the top part of actuator extension as shown in FIG. 19 will be lifted with the safety bar 132 (which is normally biased to be in contact with the microswitch) from the microswitch 173, and shut off lifting power to the lift extension. The safety bar is retained within the limit switch mounting bracket 174.

The safety bar 132 is in a biased activated mode where the shut off bar 132 contacts the microswitch 173 so as to permit energizing of the power pack assembly 301.

If the top of the vehicle contacts the shut-off bar 132 the shut-off bar will be pushed ever so slightly so that the shut off bar 132 moves away from the microswitch 173 thereby shutting down power to the power pack assembly 301. Downward activation however is still allowed. Similarly if actuator extension 178 is activated upward motion is stopped, but lowering is still allowed.

Although the preferred embodiment as well as the operation and use have been specifically described in relation to the drawings, it should be understood that variations in the preferred embodiment could be achieved by a person skilled in the trade without departing from the spirit of the invention as claimed herein

We claim:

1. An articulated arm assembly adapted to carry machine means comprising:
    (a) a first horizontal arm;
    (b) a second horizontal arm having one end pivotally connected to one end of said first horizontal arm for pivotal movement thereabout;
    (c) a third member extending vertically downwardly from another end of said second horizontal arm, said third member including:
        (i) means for connection to said machine means;
        (ii) telescoping means permitting vertical adjustment of said machine means;
        (iii) rotational means permitting rotation said machine means about an axis of said vertical member;
        (iv) means to tilt said machine means about said axis.

2. An articulated arm assembly as claimed in claim 1 wherein:
    (a) said first member comprises a horizontal first arm;
    (b) said second member comprises a second horizontal arm having one end pivotally connected to one end of said first horizontal arm for pivotal movement thereabout;

(c) said third member comprising a vertical member extending vertically downwardly from another end of said second arm.

3. An articulated arm assembly as claimed in claim 2 wherein said tilting means comprises gas shock means associated with telescoping means permitting vertical height adjustment of said machine means.

4. An articulated arm assembly as claimed in claim 3 wherein said telescoping means comprises rotational means permitting rotation of said machine means about an axis of said vertical member.

5. An articulated arm assembly as claimed in claim 3 wherein said means for adjusting the position of said machine means includes gas shock means operably connected to said telescoping means.

6. An articulated arm assembly as claimed in claim 5 wherein said machine means comprises a brake lathe means.

7. An articulated arm assembly as claimed in claim 5 wherein said machine means comprises a vacuum.

8. An articulated arm assembly to carry machine means comprising:
   (a) a first horizontal arm;
   (b) a second horizontal arm having one end pivotally connected to one end of said first horizontal arm for pivotal movement thereabout;
   (c) a member extending vertically downwardly from another end of said second horizontal arm, said member including:
      (i) means for connection to said machine means;
      (ii) telescoping means for permitting vertical adjustment of said machine means;
      (iii) rotational means permitting rotation of said machine means about an axis of said member;
      (iv) gas shock means for tilting said machine means relative said axis.

9. An articulated arm assembly adapted to be attached to a vehicle lift and adapted to carry brake lathe means comprising:
   (a) a first horizontal member having one end adapted for attachment to said vehicle lift for pivotal movement thereabout;
   (b) a second horizontal member having one end pivotally connected to another end of said first horizontal member;
   (c) a vertical member depending substantially vertically downwardly from another end of said second horizontal member;
   (d) said vertical member having another end presenting connecting means for connection of said brake lathe means to said vertical member;
   (e) said vertical member including vertical height adjusting means for adjusting the height of said brake lathe means.

10. An articulated arm assembly as claimed in claim 9 wherein said vertical height adjusting means includes a first telescoping member and a second telescoping member for slideable relative movement therebetween so as to adjust the height of said brake lathe means.

11. An articulated arm assembly as claimed in claim 10 wherein said vertical height adjustment means includes a gas shock operably connected to said first and second telescoping members.

12. An articulated arm assembly as claimed in claim 11 wherein said gas shock means are disposed internally of said first and second telescoping members.

13. An articulated arm assembly as claimed in claim 12 wherein one end of said gas shock means is connected to said first telescoping member and another end of said gas shock means is connected to said second telescoping member.

14. An articulated arm assembly as claimed in claim 13 wherein said first and second telescoping members are rotationally connected to one another.

15. An articulated arm assembly as claimed in claim 9 wherein said connection means includes means for tilting said brake lathe means relative said vertical member.

16. An articulated arm assembly as claimed in claim 15 wherein said tilting means comprises second gas shock means having one end connected to said connection means and said other end connected to one of said telescoping members.

17. An articulated arm assembly to carry machine means comprising:
   (a) a first member;
   (b) a second member pivotally connected at one end thereof to said first member for pivotal movement thereabout;
   (c) a third member extending outwardly from another end of said second member; said third member including:
      (i) gas shock means
      (ii) tilting means
   (d) said gas shock means associated with one end of articulated arm for adjusting a position of said machine means; and
   (e) said gas shock means comprising tilting means for tilting said machine means.

* * * * *